US011550951B2

(12) United States Patent
Leekley et al.

(10) Patent No.: US 11,550,951 B2
(45) Date of Patent: Jan. 10, 2023

(54) INTEROPERABLE DIGITAL SOCIAL RECORDER OF MULTI-THREADED SMART ROUTED MEDIA

(71) Applicant: Inspired Patents, LLC, Wheaton, IL (US)

(72) Inventors: Gregory H. Leekley, Charlotte, NC (US); Alexander Savenok, Grandview, MO (US); Pavel Savenok, Wheaton, IL (US)

(73) Assignee: Inspired Patents, LLC, Wheaton, IL (US)

( * ) Notice: Subject to any disclaimer, the term of this patent is extended or adjusted under 35 U.S.C. 154(b) by 0 days.

(21) Appl. No.: 17/277,344

(22) PCT Filed: Sep. 18, 2019

(86) PCT No.: PCT/US2019/051626
§ 371 (c)(1),
(2) Date: Mar. 18, 2021

(87) PCT Pub. No.: WO2020/061132
PCT Pub. Date: Mar. 26, 2020

(65) Prior Publication Data
US 2021/0312081 A1    Oct. 7, 2021

Related U.S. Application Data

(63) Continuation-in-part of application No. 16/134,075, filed on Sep. 18, 2018, now Pat. No. 10,997,620.

(51) Int. Cl.
H04N 21/4788    (2011.01)
H04N 21/475     (2011.01)
(Continued)

(52) U.S. Cl.
CPC ....... G06F 21/6245 (2013.01); G06Q 20/389 (2013.01); G06Q 30/0255 (2013.01);
(Continued)

(58) Field of Classification Search
CPC ...... G06F 21/6245; G06F 21/16; G06F 21/64; G06Q 20/389; G06Q 30/0255;
(Continued)

(56) References Cited

U.S. PATENT DOCUMENTS 5,987,150 A * 11/1999 Coppinger ............. G06F 16/40
                                                     382/100
6,285,774 B1 * 9/2001 Schumann ............. H04N 5/913
                                                     375/E7.026
(Continued)

FOREIGN PATENT DOCUMENTS

WO    2016063092    4/2016

OTHER PUBLICATIONS

Jee Yeon Hwang, P. P. i. Conesa, H. Holtzman and M. -J. Montpetit, "CommenTV: A time-sensitive social commenting system for audio-visual content," 2012 IEEE Consumer Communications and Networking Conference (CCNC), 2012, pp. 84-88, doi: 10.1109/CCNC. 2012.6181062. (Year: 2012).*

(Continued)

*Primary Examiner* — Cynthia M Fogg
(74) *Attorney, Agent, or Firm* — Christopher J. Scott

(57) ABSTRACT

Blockchain-enabled crypto asset systems and a Digital Social Recorder system are operable within a computer network environment for allowing a user to control how advertisers access the user's personal data; allowing crypto asset compensation in exchange for social amplification; and tracking asset allocation. Payments made via blockchain tracking, and the distribution of any revenues derived from cost savings provided to terrestrial, satellite or digital radio (Continued)

broadcasters back to music rights holders and other related groups are provided. These rights holders typically like to incentivize consumers, and by using the crypto assets or tokens created by the present invention, a reward for listening/consuming may be provided. Further, payments for industry services to the rights holder are contemplated to include, but not be limited to any Performance Rights Organizations (PROs), Record Labels, Publishing Companies/Administrators, Managers, Agents or any fractional rights holders or owners who would hold claim against any such revenues.

30 Claims, 8 Drawing Sheets

(51) Int. Cl.
H04N 21/858 (2011.01)
H04N 21/482 (2011.01)
H04N 21/458 (2011.01)
H04N 21/81 (2011.01)
G06F 21/62 (2013.01)
G06Q 30/02 (2012.01)
G06Q 20/38 (2012.01)
H04L 9/32 (2006.01)

(52) U.S. Cl.
CPC ......... H04L 9/3239 (2013.01); H04N 21/458 (2013.01); H04N 21/4755 (2013.01); H04N 21/4788 (2013.01); H04N 21/4828 (2013.01); H04N 21/812 (2013.01); H04N 21/8133 (2013.01); H04N 21/8586 (2013.01); G06Q 2220/10 (2013.01); H04L 2209/56 (2013.01)

(58) Field of Classification Search
CPC ........... G06Q 2220/10; G06Q 2220/00; G06Q 20/123; G06Q 20/3224; G06Q 30/0214; G06Q 30/0215; G06Q 30/0251; G06Q 30/0269; G06Q 20/065; H04L 9/3239; H04L 2209/56; H04L 2209/38; H04N 21/458; H04N 21/4755; H04N 21/4788; H04N 21/4828; H04N 21/812; H04N 21/8133; H04N 21/8586; H04N 21/2543; H04N 21/2541; H04N 21/27; H04N 21/4784; H04N 21/8113; H04N 21/44008; H04N 21/8358; H04N 21/4622; H04N 21/23892
USPC ....................................................... 725/105
See application file for complete search history.

(56) References Cited

U.S. PATENT DOCUMENTS

| | | | |
|---|---|---|---|
| 8,938,768 B2 * | 1/2015 | Kim | H04N 21/4227 725/109 |
| 9,306,989 B1 * | 4/2016 | Jayaram | H04N 21/4788 |
| 10,291,627 B2 | 5/2019 | Gleichauf | |
| 10,318,979 B2 | 6/2019 | Frank et al. | |
| 2002/0028021 A1 * | 3/2002 | Foote | G06K 9/00758 382/224 |
| 2002/0069218 A1 | 6/2002 | Sull et al. | |
| 2005/0047681 A1 | 3/2005 | Hori et al. | |
| 2007/0233544 A1 | 10/2007 | Frank et al. | |
| 2009/0292701 A1 * | 11/2009 | Saoudi | G06F 16/7854 |
| 2009/0300475 A1 * | 12/2009 | Fink | H04N 21/4781 715/230 |
| 2011/0047487 A1 | 2/2011 | DeWeese et al. | |
| 2011/0064385 A1 | 3/2011 | Gharaat et al. | |
| 2011/0225054 A1 | 9/2011 | Morris et al. | |
| 2011/0283341 A1 * | 11/2011 | Palekar | G06F 21/604 726/4 |
| 2012/0255034 A1 | 10/2012 | Orsini et al. | |
| 2012/0284090 A1 | 11/2012 | Marins et al. | |
| 2013/0028487 A1 | 1/2013 | Stager et al. | |
| 2013/0133000 A1 * | 5/2013 | Kelley | H04N 21/43079 725/37 |
| 2014/0067998 A1 * | 3/2014 | Garcia | H04N 21/235 709/217 |
| 2014/0150111 A1 * | 5/2014 | Rassool | H04N 21/835 726/26 |
| 2014/0297635 A1 | 10/2014 | Orduna et al. | |
| 2015/0025977 A1 * | 1/2015 | Doyle | G06Q 30/0269 705/14.66 |
| 2015/0120535 A1 * | 4/2015 | Evans | H04L 65/60 705/39 |
| 2015/0195095 A1 * | 7/2015 | Gillead | H04L 63/083 715/753 |
| 2015/0271546 A1 * | 9/2015 | Kim | H04N 21/4788 725/109 |
| 2015/0296228 A1 * | 10/2015 | Chen | G06F 16/78 725/34 |
| 2016/0012424 A1 | 1/2016 | Simon et al. | |
| 2016/0014477 A1 * | 1/2016 | Siders | H04N 21/4147 725/32 |
| 2016/0117709 A1 | 4/2016 | Postrel | |
| 2016/0179482 A1 | 6/2016 | Kramer | |
| 2017/0005804 A1 | 1/2017 | Zinder et al. | |
| 2017/0103472 A1 | 4/2017 | Shah | |
| 2017/0243193 A1 | 8/2017 | Manian et al. | |
| 2017/0352012 A1 | 12/2017 | Hearn et al. | |
| 2017/0358041 A1 | 12/2017 | Forbes, Jr. et al. | |
| 2017/0364825 A1 | 12/2017 | Tiell et al. | |
| 2018/0005186 A1 | 1/2018 | Hunn | |
| 2018/0137512 A1 | 5/2018 | Georgiadis et al. | |
| 2018/0181979 A1 | 6/2018 | Frank et al. | |
| 2019/0013047 A1 * | 1/2019 | Wait | G11B 27/031 |
| 2019/0019208 A1 | 1/2019 | Postrel | |
| 2019/0043138 A1 | 2/2019 | Blake et al. | |
| 2019/0073666 A1 | 3/2019 | Ortiz et al. | |
| 2019/0087844 A1 | 3/2019 | Leekley et al. | |
| 2019/0251591 A1 | 8/2019 | Frank et al. | |
| 2020/0074461 A1 | 3/2020 | DeRosa-Grund | |
| 2020/0134616 A1 | 4/2020 | Rafalko | |
| 2020/0145194 A1 * | 5/2020 | Stollery | G06Q 20/36 |

OTHER PUBLICATIONS

Wang, et al. "Financing Open Blockchain Ecosystems: Toward Compliance and Innovation in Initial Coin Offerings." Mar. 2018 (Mar. 2018) Retrieved on Mar. 17, 2021 (Mar. 17, 2021) from <https://hal.archives-ouvertes.fr/hal-02046793/document>.

* cited by examiner

INTEROPERABLE DIGITAL SOCIAL RECORDER OF MULTI-THREADED SMART ROUTED MEDIA

PRIOR HISTORY

This patent application is a national phase entry application under 35 U.S.C. § 371 of International Patent Application No. PCT/US2019/051626 filed in the United States Patent and Trademark Office as International Receiving Office on 18 Sep. 2019, which International Patent Application claims the benefit or priority date of pending U.S. patent application Ser. No. 16/134,075 filed in the USPTO on 18 Sep. 2018.

BACKGROUND OF THE INVENTION

Field of the Invention

The present invention generally relates to providing multi-threaded smart routing of mixed forms of media along with a Digital Social Recorder of the same and a rewards system based upon virtual or crypto asset technologies, and more particularly to certain blockchain-enabled crypto asset systems and associated methodology for allowing users to control how advertisers access their personal data; how advertisers place their ads within the most optimal content viewing or listening; allow users to be compensated with crypto assets in exchange for consumption and social amplification; and allowing content creators and any talent that is the focus of the consumer attention within the content to be compensated with crypto assets; and tracking crypto asset allocation.

Brief Description of the Prior Art

United States Patent Application Publication No. 2005/0286546, authored by Bassoli, et al., discloses Synchronized Media Streaming between Distributed Peers. The Bassoli et al. publication describes certain methods and apparatus for providing synchronous playback of the same piece of time-based media on multiple devices connected over heterogenous channels consisting of varying degrees of delay. The preferred embodiment of the invention is a handheld music player that uses a Wi-Fi or Bluetooth communications link to enable users to share music with similar nearby players and to synchronously play back the same music different players simultaneously. Users of all players tuned into one source hear the same thing at the same time, enabling the feeling of a shared music experience. Users can also use their players to exchange profile information and text messages.

It will be seen from a review of the Bassoli et al. publication, however, that the document does not teach or suggest a system in which a group of users who wish to share music with one another may do so via synchronized music consumption via separate legal access points or legally compliant content sources. The preferred embodiment of the Bassoli invention is a hand-held music player referred to as, "tunA" that permits its user to share music with other "tunA" users who are nearby (emphasis added). The device is characterized by the following attributes: A person can listen to their own music as they would using conventional portable MP3 or CD player, but they can also tune in and listen to the same music and programming other people are listening to on their tunA devices, resulting in a shared music experience. (See Paragraph No. 0026 of Bassoli).

An audio stream timing/delay algorithm enables the audio playback to be perfectly synchronized on a source player and any nearby destination player, so that people tuned into a particular person's device can be listening to exactly what that other person is listening to. For example, two or more people in a gathering, each holding their own tunA player, can all tune to one of the players, and all of them can be nodding their heads, gesturing, or dancing in perfect synchrony, just as if they were all listening to the same conventional broadcast radio station. (See Paragraph No. 0027 of Bassoli).

The reader will note that the content being consumed in a synchronous manner by the Bassoli "tunA" player(s) preferably originates from a single source player (with a single legal access point or legally compliant content source) and is redistributed to others who are nearby via either a Wi-Fi protocol or using built in Bluetooth transceivers. (See Paragraph No. 0039 of Bassoli). A variation on the preferred embodiment is contemplated in that the source device may not source the content from device-based mass storage, but rather redistribute content that arrives at the source device from a broadcast station or streamed via an Internet-based stream service provider. (See Paragraph No. 0076 of Bassoli). In both of these latter cases, however, the source of the content is respectively derived from either the broadcast station or the Internet stream service provider each of which have their own respective legal access points, and carried through or redistributed to the nearby group members via the Wi-Fi protocol or Bluetooth transmissions.

United States Patent Application Publication No. 2008/0134258, authored by Goose et al., discloses a Multi-Source and Resilient Video on Demand Streaming System for a Peer-to-Peer Subscriber Community. The Goose et al. publication describes Centralized video on demand (VoD) systems offer limited content and limited archival ability. Peer-to-peer networks allow users to share a wide selection of content directly among peers, but connections between peers may have limited uplink bandwidth and may be unreliable. The present invention builds upon various systems and methods for high quality and resilient transmission of streaming data from one or more legally compliant content sources within a heterogeneous peer-to-peer network to address these and other problems.

The service provider VoD system 200 of Goose comprises a managed infrastructure 210, a media server 220, a content library 230, and a service provider managed peer-to-peer (p2p) network 250. The p2p network 250 further comprises peer devices 260a, 260b, 260c (exemplified as set top boxes and identified as peer devices 260) and augmented content library 270a and 270b identified as augmented content library 270. The augmented content library 270 comprises downloaded and/or recorded content stored on peer devices 260. For example, peer devices 260 may download and/or record and store streamed media from content library 230 over managed infrastructure 210. Augmenting the VoD system's content library 230 with the augmented content recorded by any subscriber connected to the p2p network 250 yields an increased choice of content and creates a community VoD system.

A client device 240 may be communicatively coupled with the service provider VoD system 200 and receives downloaded or streamed content from either the content library 230 or from the augmented content library 270 as part of a video on demand service. The managed infrastructure 210 handles downloading and streaming requests from the client device 240 and manages the control and data connections between service provider VoD network 200 and the client device 240. The media server 220 may perform on demand streaming of requested media from the content library 230 to the client device 240 over the managed infrastructure 210.

Alternatively, the client device 240 may request on demand streaming of requested media from the augmented content library 270. The p2p network 250 handles these requests and manages the control and data connections between the p2p network 250 and the client device 240 to perform on demand streaming of requested media from augmented content library 270 to the client device 240.

To summarize the Goose VoD system, Applicant takes particular note that the service provider VoD system 200 comprises a managed infrastructure 210, a media server 220, a content library 230, and a service provider managed peer-to-peer (p2p) network 250, which p2p network 250 further comprises peer devices 260 and an augmented content library 270. A client device 240 may be provided with content from either library 230 or library 270. Both libraries 230 and 270, however, represent a single legal access point for the sourced content. In other words, the VoD system 200 operator has secured certain rights to deliver the content. Goose et al. have not shown or described a synchronization system that delivers content from a user-dictated or user-governed or user-preferred legal access point as selected from at least two separate legal access points or legal compliant content sources.

United States Patent Application Publication No. 2010/0017455, authored by Svendsen et al., discloses Customized Media Broadcast for a Broadcast Group. The Svendsen et al. publication teaches or describes Methods and systems are provided for delivering a customized media broadcast to a social group of users referred to as a broadcast group. In general, a broadcast group including a number of users is identified. User profiles of the users forming the broadcast group are obtained and aggregated to provide a group profile for the broadcast group. More specifically, in one embodiment, the users forming the broadcast group are weighted, and the user profiles of the users are then aggregated according to the weights assigned to the corresponding users to provide the group profile of the broadcast group. A customized media broadcast is then delivered to the users forming the broadcast group based on the group profile of the broadcast group.

United States Patent Application Publication No. 2012/0304233, authored by Roberts et al., discloses Systems and Methods for Bridging and Managing Media Content Associated with Separate Media Content Networks. The Roberts et al. publication teaches at least one computing device located within a local media content network and configured to 1) generate a media index of local media content stored by one or more media content access devices located within the local media content network and cloud media content stored by one or more cloud computing devices located within a cloud media content service network and 2) manage the local media content and the cloud media content based on the media index and on a predefined media management heuristic.

The Svendsen et al. and Roberts et al. teachings do not teach how to map media content across providers. In other words, the prior art teachings typically instruct on how two devices may be able to share a stream from a single provider, there being no corresponding mechanism or means (a) for mapping media content across providers, or (b) for streaming the same media content from a second provider when the media content is identical to the media content provided by a first provider. There is no reference to metadata mapping algorithms, nor is there any reference to any fingerprinting mechanisms to identify media content, and properly attribute media content to or associate media content with owners thereof across content providers.

U.S. Pat. No. 8,667,075 ('075 Patent), issued to King et al., discloses a System and Method for Implementing a Subscription-Based Social Media Platform. The '075 Patent describes systems and methods for implementing a subscription-based social media platform whereby a content creator generates live content on a mobile device and sends requests to a server for initializing a live stream from the mobile device. The server sends requests to encoding service providers. The encoded live content is sent to a content storage server. Subscribers of the social media platform can access the live content on their mobile devices from the content storage server.

The '075 Patent further claims a method for implementing a subscription-based social media platform comprising the steps of: a server receiving from a content creator a request for initializing at least one of an email, a short message service (SMS) message, and a voice message; the server determining a plurality of subscribers with subscription to receive content from the content creator; the server retrieving from a database information about the plurality of subscribers; and the server: (a) sending to an email service provider the request, information about the plurality of subscribers, and the content from the content creator, if the request is a request for an email address; (b) sending to an SMS message service provider the request, information about the plurality of subscribers, and the content from the content creator, if the request is a request for an SMS message; and (c) if the request is a request for a voice message performs further functions.

The further functions may include: (1) sending to a content storage server an audio file corresponding to the content from the content creator; (2) sending to an encoding service provider the request; and (3) sending to a voice service provider the request, in response to notification from the encoding service provider that the audio file is encoded. The server may further receive a defined reward for the plurality of subscribers and a defined goal for the plurality of subscribers in connection with the content created by the content provider; receive the defined reward and the defined goal; and monitor whether the defined goal is reached for each subscriber. The present invention further builds upon the concepts disclosed in the '075 Patent.

U.S. Pat. No. 9,549,024 ('024 Patent), issued to Leekley et al., discloses a Routing and Synchronization System, Method, and Manager. The '024 Patent basically describes a system operable with in a peer-to-peer (P2P) content delivery network that delivers select data files to an end user. The content delivery network provides a client, a P2P gateway server, and a Resource Name Server (RNS) within a computer-populated network. The RNS caches data resource locations within the computer-populated network and resolves resource requests with optimal data resource locations within the computer-populated network.

The gateway server requests and receives optimal data resource locations via the RNS; requests and receives data files from the computer-populated network via the optimal data resource locations; and processing received data files for data file delivery to the client. The network thus enables an origin-agnostic data delivery method for optimally delivering select data files to an end user. A data-routing governance or management utility governs/manages the content delivery network and associated methodology for providing industry rights management, compliance monitoring, and/or compliance reporting of data file transmissions.

U.S. Pat. No. 9,729,497 ('497 Patent), issued to Lee et al., discloses a System and Method for Implementing a Subscription-Based Social Media Platform. The '497 Patent describes certain systems and methods for implementing a subscription-based social media or fan club platform wherein a content creator generates live content on a mobile device and sends requests to a server for initializing a live stream from the mobile device. The server sends requests to encoding service providers. The encoded live content is sent to a content storage server. Subscribers of the social media or fan club platform can access the live content on their mobile devices from the content storage server. Variants of the '497 Patent are further specified in U.S. Pat. Nos. 8,667,075; 8,769,031; 9,094,362; and 9,438,553.

United States Patent Application Publication No. 2017/0041280 ('280 Publication), authored by Savenok et al., discloses a Smart Routing Synchronization System and associated Methods for Socializing a Synthetic Rebroadcast and Group Stream. The smart routing synchronization system(s) of the '280 Publication socialize a synthetic rebroadcast or group stream for enabling members of a user group to (re)broadcast select content to other members of the user group and collaboratively curate content delivery. The systems are based on a content-identification process and further a process for (re)broadcasting content.

These processes are co-operable among a group of member clients each of which are in communication with at least two content sources. The synchronization process identifies select content and directs delivery of the content from an optimal resource for each member client via a smart routing protocol. The (re)broadcast process prompts delivery of the select content to members of the user group from a content origination member of the group, and group members are thereby able to simultaneously access the content for the purpose of providing a content-based platform for social interaction. As in the '024 Patent, the '280 Publication further describes a data-routing governance or management utility that governs/manages the content delivery network and associated methodology for providing industry rights management, compliance monitoring, and/or compliance reporting of data file transmissions.

A blockchain may be defined as a growing list of cryptographically linked records called blocks. Each block contains a hash of the previous block, a timestamp, and transaction. A blockchain is said to be resistant to modification of the transaction data and basically provides a transaction ledger that records transactions between two parties efficiently and in a verifiable and permanent way. For use as a transaction ledger, a blockchain is typically managed by a P2P network collectively adhering to a protocol for inter-node communication and validating new blocks.

Given the industry rights management necessity of the systems taught by the prior art set forth hereinabove, the prior art perceives a need for certain blockchain-enabled crypto asset systems and associated methodology for allowing users to control how advertisers access their personal data; allowing users to be compensated with crypto assets in exchange for social amplification; and tracking coin allocation n a two party agreement with a public portion, with a song list generation algorithm used to control the expansion of the coin supply.

Virtual currencies and especially cryptocurrencies such as bitcoin, ethereum (ether), litecoin, etc. have been increasing in popularity in recent years. Holders of bitcoin and other cryptocurrencies are not tied to any government, are decentralized, and allow direct transactions, while still maintaining the trust and stability of fiat currencies. Bitcoin in particular appears to be more than a passing fad and with billions in total value in distribution, bitcoin stores significant economic potential. Despite the popularity of cryptocurrencies to date, all cryptocurrencies face the same drawback in that they are not widely accepted.

A smart contract is a computer protocol intended to digitally facilitate, verify, or enforce the negotiation or performance of a contract. Smart contracts allow the performance of credible transactions without third parties. These transactions are trackable and irreversible. Proponents of smart contracts claim that many kinds of contractual clauses may be made partially or fully self-executing, self-enforcing, or both. The aim of smart contractsis to provide security that is superior to traditional contract law and to reduce other transaction costs associated with eontracting. Various cryptocurrencies or crypto asset-based systems have implemented types of smart contracts in an attempt to address the shortcomings of cryptocurrency or crypto asset transactions. The present invention attempts to build upon the state of the art embraced by these concepts as summarized in more detail hereinafter.

SUMMARY OF THE INVENTION

The authors of these specifications provide a crypto asset or "token" tailored specifically for the sports, music, and entertainment industry that applies blockchain technology innovations as a primary means for more properly executing the technologies set forth in the prior art enumerated hereinabove in connection with compliance and payment methods, particularly those set forth in U.S. patent application Ser. No. 14/099,348 ('348 Application) and Ser. No. 15/305,977 ('977 Application) upon which these specifications attempt to build. The data-routing governance or management utilities of the '348 and '977 Applications that operate to govern/manage the content delivery networks are critical to properly provide for industry rights management, compliance monitoring, and/or compliance reporting of data file transmissions.

The present specifications provide that critical compliance. Payments made via blockchain tracking, and the distribution of any revenues derived from cost savings provided to terrestrial, satellite or digital radio broadcasters back to music rights holders and other related groups are provided. These rights holders typically like to incentivize consumers, and by using the crypto assets or tokens created by the present invention, a reward for listening/consuming may be provided. Further, payments for industry services to the rights holder are contemplated to include, but not be limited to any Performance Rights Organizations (PROs), Record Labels, Publishing Companies/Administrators, Managers, Agents or any fractional rights holders or owners who would hold claim against any such revenues.

The same concepts can be applied to revenues resulting from brands looking for ways to reach consumers of entertainment media via the environment at least provided by the '348 and '977 Applications, including revenues from advertisement placements within said environment, and programmatic placement of advertising tailored to the individual consumer within said environment regardless of the specific entertainment content being digested where the advertising or marketing is targeting the individual consumer, and not those watching or listening to specific entertainment content. Within this broader, non-specific content context, however, placement may be relative to certain types of inter-content events such as a touchdown by a specific team or player.

The present invention further envisions fostering more direct incentives for cooperation between entertainment providers and their fans both individually as well as in a group (e.g. crowd-based milestones as described in more detail in at least the '977 Application), as well as any brands wishing to reach these individual fans or groups of fans by tracking and tying rewards or payments for fans/consumer consumption of an artist or entertainment provider's content where fans or a group of fans participate with the artist or entertainment provider's revenues from both the content itself as well as third party brands or advertiser incentives.

In other words, individual fans or consumers may be rewarded for consuming the entertainment and advertising/marketing content provided by the environment supported by the by the '348 and '977 Applications, as well as the environments supported by U.S. Pat. Nos. 8,667,075; 8,769,031; 9,094,362; 9,729,497 9,438,553; and 9,729,497. Similarly, a group of fans with crowd-based milestones for consuming the entertainment content within said environment may be rewarded for consuming the entertainment content. Further, brand-based rewards and incentives may be paid out to either individual fans/consumers of entertainment content or a group of fans with crowd-based milestones, who may also be offered incentives for purchasing decisions including, but not limited to time-based purchasing decisions according to the present invention.

Rewards for the amplification of the activities within the foregoing environment(s) may be further provided to followers or consumers of posted or shared content according to the present invention. The Rewards/Tokens provided by the present invention may provide exclusive access rights rather than financial reward or participation. Such access rights may be earned via these environments or the amplification to others within these environments may include such things as a first right to buy tickets to an event or exclusive reserved VIP seating access or a "meet and greet" the artist either physically or digitally where these environments exist to the content of that artist.

These specifications further contemplated the use of a new type of fan reward card that is tethered to an open set of rewards and capable of tracking purchasing behavior of both individual fans of an artist, athlete, or entertainment entity as well as groups of fans at moment of purchase in order to either accumulate rewards based upon environmental activity of environments supported by U.S. Pat. Nos. 8,667,075; 8,769,031; 9,094,362; 9,729,4979,438,553; and 9,729,497; or use reward points for the purchasing of goods and services based upon environmental activity of said environment(s).

This new type of fan reward card or account that may be tethered to an existing consumer debit card or bank account or held within a mobile wallet and provides a mechanism for the real time reconciliation of time sensitive rewards by intercepting the authorization request from the point of sale (POS) of the participating brand/provider of goods and services wishing to incentivize a given group of fans or the acquiring bank partner of that brand/provider of goods and services. Reconciliation via such a secondary reward reconciliation process and gateway can match an advertised incentive with purchasing behavior and grant rewards based upon both individual as well as group purchasing activity. Reconciliation via such a secondary reward reconciliation process and gateway can also match an advertised incentive with purchasing behavior and pay using previously granted rewards The present invention further contemplates the provision of a crypto ghost coin or token for shielding the identity of the person being rewarded for the participation in all activities listed above so that fans/consumers of content can remain anonymous should they wish both to the entertainment provider or property as well as to the advertising brands or providers of goods and services according to the foregoing, while at the same time being more precisely targeted for their personal demographic, geographic, and consumption behavior. The objective of this ghost method of programmatic rewards is to maintain the efficiency and efficacy of personalization and product fit with an individual consumer of entertainment without that individual compromising their privacy and identity.

An example of the synthetic social broadcast amplification according to the present invention, the reader may refer to Vertigo brand application providing Song Story Contests and User Generated Content (UGC) left behind on the Feed section of the application. When a user creates content (UGC) in the form of videos, photos, etc. and appends it on any segment of a song, other users or his or her friends or followers want to payback that content, no matter if it is still in time of contest or from the feed section of the application, content playback starts with the song segment attached to that and thus compliance reporting becomes critical within this social environment.

The appended music or media file not only makes the UCG such as videos, or photos, etc. more entertaining, but also creates value for rights owners such as artists, writers, labels, etc. by "spinning" or streaming the song from premium media content providers such as Spotify, AppleMusic etc. A most important component for music or media content providers such as Spotify, AppleMusic etc. is determining the amount of payment compensation to fans and rights owners via the number of "spins" or streams.

Even a small influencer or individual consumer is thus able to significantly increase the number of times a particular song or similar other media plays back or "spins"/streams by inviting his or her followers to see the UGC, or by creating interesting and entertaining UGC attractive to other social media users or by other means. The contest of the Vertigo branded application itself is a significant "gamification" of the synthetic social broadcast amplification effect which creates a condition for viral adoption.

To achieve at least the foregoing objectives, the present invention basically provides certain blockchain-enabled crypto asset systems operable within a computer network environment which at least allows (a) a user to control how advertisers access the user's personal data; (b) allowing crypto asset compensation in exchange for social amplification; and (c) tracking asset allocation.

According to the invention there is provided a blockchain-enabled crypto asset system operable within a computer network environment which is configured to allow a user to control how advertisers access the user's personal data, the blockchain-enabled crypto asset system comprising:

a remote computer-based service system within the computer network environment, the remote computer-based service system being configured to (a) connect 3rd party service/content providers to a user blockchain; (b) validate 3rd party input data to the user blockchain; (c) optimize consumption data references; and (d) enable advertisement-targeting services to interact with the user blockchain;

at least one client device is configured to enable the user to interact with the user blockchain and the remote computer-based service system; and a non-transitory computer-implementable application being implementable via the at least one client device and the remote computer-based service system is configured to enable the user to (a) initiate input to the user blockchain via the at least one client device; (b) input personal demographic data and data release rules to the user blockchain; and (c) set data retention rules;

the user blockchain provides (a) a mechanism which is configured to store and release user data for giving the user control of the user's personal data and (b) a mechanism to release the user's personal data for economic consideration, the user blockchain being configured to operate to hold a transaction ledger, the transaction ledger for tracking transactions between the advertisement-targeting services and the user blockchain; and (c) a proof of transaction, the proof of transaction being usable by the user to redeem rewards offered by the advertisement-targeting services in exchange for personal data.

In one embodiment of the invention the remote computer-based service system is configured to be operable to connect 3rd party service/content providers to the user blockchain by mapping IP addresses used by the user as reported by the at least one client device for blockchain identification. Preferably, the remote computer-based service system is configured to take IP addresses provided by 3rd party service/content providers, and preferably, use a reference database to map IP addresses for blockchain identification to provide the only blockchain address permitted to write validated consumption data to the user blockchain. Advantageously, the remote computer-based service system is configured to be operable to optimize consumption data references by one of creating a hash table with unique hashes for reported consumption, and only writing hashes to the user blockchain, or alternatively creating categories for consumption, and writing category identifications to the user blockchain.

In another embodiment of the invention the remote computer-based service system is configured to provide mapping between at least one client device IP address and blockchain identification to enable advertisement-targeting services to interact with the user blockchain to receive personal user information provided a preferred targeted advertising meets a set of rules within the user blockchain. Advantageously, the user blockchain is configured to respond with an alternative targeted advertising request to the advertising-targeting service provided the preferred targeted advertising does not meet the set of rules within the user blockchain. Preferably, the data retention rules are configured to determine what personal consumption data will be retained by the user blockchain and advantageously, for what duration the personal consumption data will be retained by the user blockchain, the personal consumption data being updatable by selected verified 3rd party service/content providers.

In another embodiment of the invention the remote computer-based service system is configured to enable advertisement-targeting services to route targeted advertisements tailored to a user within a smart routing synthetic broadcast system or environment to the user based on personal user information provided and that the targeted advertisements meet a set of rules within the user blockchain. Preferably, the remote computer-based service system is configured to enable advertisement-targeting services to route targeted advertisements tailored to a user within a live social re-broadcast within the smart routing synthetic broadcast system or environment, to the user based on the personal user information provided in the user blockchain and that the targeted advertisements meet a set of rules within the user blockchain.

Advantageously, the remote computer-based service system is configured to enable advertisement-targeting services to route targeted advertisements tailored to a user within a Digital Social Recording System within the smart routing synthetic broadcast system or environment, based on the personal user information provided in the user blockchain and that the targeted advertisements meet a set of rules within the user blockchain.

The invention also provides a blockchain-enabled crypto asset social amplification system operable within a computer network environment which is configured to allow crypto asset compensation in exchange for social amplification, the blockchain-enabled crypto asset social amplification system comprising:

a remote computer-based service system within the computer network environment, the remote computer-based service system being configured to govern user content amplification attribution data input to a user blockchain, the user content amplification attribution data comprises, a listing of select content shared by the user, campaign identifications associated with the select content, and a type of consumer interaction;

at least one client device is configured to enable the user to interact with the user blockchain and the remote computer-based service system; and a non-transitory computer-implementable application being implementable via the at least one client device and the remote computer-based service system enables the user to (a) initiate input to the user blockchain via the at least one client device; and (b) input personal user demographic data;

the at least one client device being configured to generate an influencer amplification identification linked to the user blockchain via a request to the remote computer-based service system, the user blockchain being operable to hold a transaction ledger, the transaction ledger is configured to track blockchain transactions based on the user content amplification attribution data and being usable by the user to redeem rewards offered by 3rd party service/content providers in exchange for personal data.

In another embodiment of the invention the user blockchain blockchain-enabled crypto asset social amplification system provides a mechanism for storing and releasing user data giving the user control of the user's personal data, and a mechanism to release the user's personal data for economic consideration.

In one embodiment of the invention the user blockchain comprises user demographic data, the user demographic data being usable to encourage users of a specific demographic to share more by having the 3rd party service/content providers the ability to specify payout rules for amplification payouts to the users of a specific demographic, and preferably, the user blockchain is configured to store a copy of the amplification payout rules.

In another embodiment of the invention the blockchain-enabled crypto asset social amplification system may also center on the performance of certain talent and subjects of the shared content gaining the most social attention. For instance, rather than the specific user or fan base (or club) being rewarded for the amplification, in addition to or at the request of the specific user or fan base (or club) a certain athlete, artist, comedian may also be rewarded for inspiring the amplification for their performance on the field in the case of an athlete or relevant content showcasing the talent.

In another embodiment of the invention an amplification campaign blockchain is released in the form of a smart contract with qualified shares being reported to the amplification campaign blockchain, preferably, the amplification campaign blockchain is configured to register valid amplification event payouts based on a set of rules set at initialization of the smart contract. Preferably, the smart contract comprises a reference to the select content for amplification, and ideally, the valid amplification event payouts are registered by providing a link between an influencer amplification identification and a blockchain identification via the remote computer-based service system.

In another embodiment of the invention the amplification campaign blockchain duplicates transactions by sending a validated transaction registration request to the user blockchain, and preferably, the user blockchain is configured to determine capital distribution based on contract capital allocation determined by the set of rules. Preferably, the valid amplification event payouts are claimed in response to the registration of a payout transaction in the transaction ledger which indicates capital distributed to the user in exchange for earned amplification credits/tokens registered in the transaction ledger.

In another embodiment of the invention the remote computer-based service system retains the set of rules, preferably, the set of rules are duplicated to the user blockchain, and advantageously, the set of rules are registered by the 3rd party service/content providers via a registration request to the remote computer-based service system. Preferably, the registration request registers the campaign identifications, and preferably registers amplified content, and advantageously, registers the set of rules, ideally, the remote computer-based service system is configured to register valid amplification event payouts by using the user identification for blockchain mapping. Preferably, the remote computer-based service system calculates the valid amplification event payouts based on user demographic data retrieved from the user blockchain.

The invention also provides a blockchain-enabled crypto asset compliance system operable within a computer network environment which is configured to track asset allocation, the blockchain-enabled crypto asset system comprising:

a remote computer-based service system within the computer network environment, the remote computer-based service system being configured to provide and maintain a cross provider reference database, the cross provider reference database being configured to map media provider content to media content hashes within a media content pool via one of a metadata mapping mechanism or a media content finger printing mechanism;

at least one client device which is configured to enable the user to interact with a user blockchain and the remote computer-based service system; and a non-transitory computer-implementable application which is implementable via the at least one client device and the remote computer-based service system to enable the user to (a) initiate input to the user blockchain via the at least one client device; (b) input personal demographic data and data release rules to the user blockchain; and (c) set data retention rules;

the at least one client device is configured to create media content playlists, the media content playlists provide a basis for media content order hash generation, the at least one client device is configured to extract media content hashes from the media content pool, and use the media content playlists and the media content hashes stored in the cross provider reference database as inputs for algorithm generation, the at least one client device generating an ordered media content list hash, the ordered media content list hash being submitted to the user blockchain;

the user blockchain being configured to provide (a) a mechanism which stores and releases user data, and (b) a mechanism to release the user's personal data for economic consideration, the user blockchain being configured to operate to hold a transaction ledger, the transaction ledger being configured to track blockchain transactions based on media content consumption and being usable by the user to redeem rewards offered by 3rd party service/content providers.

In one embodiment of the invention the ordered media content list hash matches a hidden ordered media content list hash to prompt new asset generation, and preferably, to prompt supplemental ordered song list hash generation.

In one embodiment of the invention the user blockchain is initiated when contract initiation rules are met, preferably, original asset allocations are assigned on contract initiation by requests from a primary initiating partner and a secondary initiating partner via identical contract initiation allocations. Advantageously, the user blockchain is configured to generate new assets via an algorithmic mint process, the algorithmic mint process being configured to generate the hidden ordered media content list hash from a list of the media content hashes. Preferably, the algorithmic mint process is configured to use an ever-increasing number of media content files associated with every hash matched against a client hash submitted by the at least one client device.

In one embodiment of the invention hidden hash complexity is driven by first and second factors, the first factor being the number of media content files in the hidden ordered media content list hash, the second factor being the number of possible media content files available to fit into each position in the hidden ordered media content list hash, and preferably, each position is randomly filled from the media content hash pool.

In another embodiment of the invention upon media content hashes being added to the media content pool by the secondary initiating partner, the media content hashes are preferably added to the cross provider reference database, and advantageously, the cross provider reference database in response to the media content hashes being added thereto, is configured to map 3rd party service/content provider data to the media content hashes.

In one embodiment of the invention select assets provide a right of access to the user blockchain, the right of access being resalable.

The present invention further contemplates a Digital Social Recorder or DSR system built to allow user comments and engagement with live or on demand broadcast content to be registered in a centralized manner, allowing a user to see social commentary related to specific portions of a broadcast, whether watched on demand or live. The so-called DSR system makes this possible by using a video search system that permits the searching of thousands of video hours within seconds. An exemplary application scenario may be said to involve a sports broadcast transmitted via three different networks to three different people, each of whom tender social posts regarding the broadcast with a video and associated commentary even when social posts are originating from potentially but necessarily three different social media networks, social posting tools or camera sources.

The DSR system allows a user viewing through the DSR system to see the same broadcast through his or her network of choice with the social comments generated by people at the exact time in the broadcast that inspired the comment. If the broadcast is live, the user is able to view previous portions of the broadcast with social content layered in, and if the broadcast is on demand, the user sees comments layered in as the user watches the video broadcast. In both the live and non-live environments, users can also switch between social channels while remaining at the same place in the underlying broadcasted content. The present invention further envisions allowing users to discretely mix social content and other alternative network provided content with the original content being consumed and commented upon. In other words, a user may choose a radio feed or alternative social commentator for audio feed coupled with the original underlying video broadcast and social overlay and metadata provided by a group of friends.

Further the invention provides a Digital Social Recorder system operable within a computer network environment which is configured to allow (a) a series of users to comment and engage with a live or an on-demand broadcast content to be registered in a centralized manner, and (b) allow the series of users to see social commentary related to specific portions of either the live or the on-demand broadcast, the DSR system comprising:

a remote computer-based service system within the computer network environment, the remote computer-based service system being configured to provide and maintain a cross provider reference database, the cross provider reference database being configured to map media provider content to media content hashes within a media content pool via one of a metadata mapping mechanism or a media content finger printing mechanism;

a video indexing and search system in co-operation with the remote computer-based system, is configured to permit the video indexing and search system to search video content via the remote computer-based system;

a series of client devices which are configured to enable the series of users to interact with the remote computer-based system; and a non-transitory computer-implementable application implementable via the series of client devices and the remote computer-based service system to enable the series of users (a) to initiate social commentary atop select video content via the series of client devices; (b) input personal demographic data and data release rules to the remote computer-based service system; and (c) set data retention rules;

the Digital Social Recorder system being configured to allow the series of users to view therethrough the same broadcast through a legally compliant content source which is selected by each user, with social commentary generated by users being communicated to other users simultaneously;

each user being able to view previous portions of the broadcast with corresponding social content layered atop the respective previous portions of the broadcast when the broadcast is live, and each user being able to view the corresponding social commentary layered atop the broadcast as the user watches the broadcast when the broadcast is pre-recorded and viewed through an on-demand service.

In one embodiment of the invention the video indexing and video search system is configured to map video content back to its original broadcast by indexing event broadcast streams, the event broadcast streams being from different legally compliant content sources and indexed into pixel indexes, preferably, each pixel index comprises a pixel matrix in which a select video frame dimension as selected from video frame height and video frame width is held constant, and a select video frame dimension varies based on original video aspect ratio.

Preferably, the video indexing and video search system is configured to map video content back to its original broadcast by indexing event broadcast streams, advantageously, the event broadcast streams are from different networks and indexed into pixel indexes, and ideally, the video indexing and video search system comprises a mechanism to size all frames into a standardized aspect ratio for simplifying a search process. Preferably, the video indexing and video search system utilizes a deduplication process which is configured to create references in a pixel reference database for portions of select same streams with references to a deduplicated pixel index which creates a many to one relationship between the select same streams and the pixel indexes.

In another embodiment of the invention the video indexing and video search system is configured to commence in response to a select video file or a select video file URL being submitted by a select client device to the remote computer-based system, and preferably, process the select video file or video file URL into frames, the processed frames being extracted into a target image size. Advantageously, the video indexing and video search system is configured to produce a concatenated pixel search matrix from a series of frames to query against a video database. Preferably, the video indexing and video search system is configured to produce a series of pixel search matrices, and advantageously, is configured to produce a concatenated pixel search matrix which is produced for each frame that will be used in a search query.

In another embodiment of the invention the video indexing and video search system is configured to allow broadcasters to index streams/content, preferably, the streams/content is queried by a web crawling system, advantageously, the web crawling system is configured to output video content posted on social networks, and ideally, to map the video content posted on social networks to their original streams. Preferably, the video content posted on social networks and mapped to their original streams are indexed and stored in a social reference database, advantageously, the social reference database is configured to associate social posts with stream identifiers and start and stop positions for social commentary.

In another aspect of the invention the series of client devices are enabled to stream indexed stream/content; and preferably, retrieve social post data from the social reference database; and advantageously, overlay social commentary on a video timeline; or alternatively display social commentary as video content is streamed.

In one embodiment of the invention performer attribution is added to reference data within the remote computer-based service system in order to facilitate payout to select performers via a smart contract.

In another embodiment of the invention the Digital Social Recorder system is configured to enable contextual user-directed advertisement placement or a contextual advertisement metadata overlay based upon video content consumption and/or social commentary associated with video content consumption relevant to saved user profile information saved within a crypto ghost coin account which is configured to shield the identity of the user being rewarded for activity participation while simultaneously being targeted based on personal demographic, geographic, and consumption behavior.

Additionally, the invention provides a video indexing and search system which is operable within a computer network environment, the video indexing and search system being configured to search video content by indexing video streams or files, the video streams or files being obtained from different sources and indexed into pixel indexes which are stored within a remote pixel reference database, the pixel indexes comprising row and column values denoting start frame data and end frame data for specific broadcast streams, each pixel index being a matrix of pixels that are used as a target matrix in computer vision processing which is configured to enable the use of a plurality of computer vision algorithms to support video content searching, the video indexing and video search system is configured to commence in response to a select video file or a select video file URL being submitted by a select client device to remote services.

In one embodiment of the invention each pixel index comprises a pixel matrix in which a select video frame dimension as selected from video frame height and video frame width is held constant, and preferably, a select video frame dimension varies based on original video aspect ratio. Advantageously, the video indexing and search system comprises a mechanism which is configured to size all frames into a standardized aspect ratio for simplifying a search process.

In another embodiment of the invention the video indexing and video search system is configured to utilize a deduplication process which creates references in the remote pixel reference database for portions of select same streams with references to a deduplicated pixel index thereby creating a many to one relationship between select same streams and the pixel indexes.

Preferably, the video indexing and video search system is configured to produce a concatenated pixel search matrix from a series of frames to query against a video database, and advantageously, is configured to produce a series of pixel search matrices, a concatenated pixel search matrix being produced for each frame used in a search query.

In another embodiment of the invention the video indexing and video search system is configured to allow broadcasters to index streams/content, preferably, the streams/content being queried by a web crawling system, advantageously, the web crawling system is configured to output video content posted on social networks, and ideally, to map the video content posted on social networks to their original streams. Preferably, the video content posted on social networks and mapped to their original streams are indexed and stored in a social reference database, advantageously, the social reference database is configured to associate social posts with stream identifiers and start and stop positions for social commentary.

In one embodiment of the invention the video indexing and search system is configured to co-operate with a series of client devices to enable the series of client devices to stream indexed stream/content; and preferably, retrieve social post data from the social reference database; and advantageously, overlay social commentary on the a video timeline; or alternatively, display social commentary as video content is streamed.

BRIEF DESCRIPTION OF THE DRAWINGS

Other features of the invention will become more evident from a consideration of the following brief descriptions of patent drawings.

Figure 1:
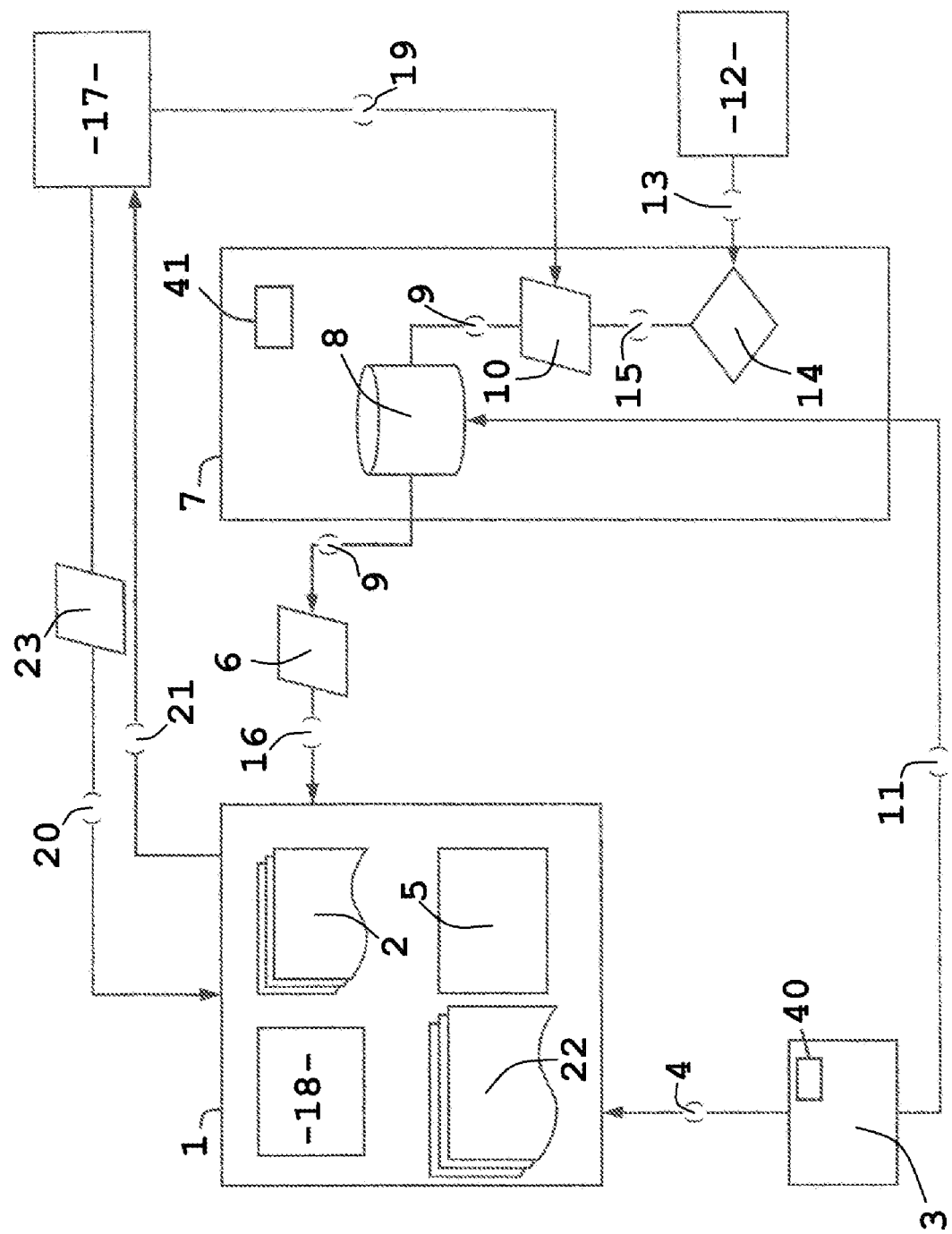
FIG. 1 is a flowchart diagram of a first system according to the present invention depicting a user blockchain in communication with a remove, computer-based service system and at least one client device.

DETAILED DESCRIPTION OF THE
PREFERRED EMBODIMENTS AND
METHODOLOGY

Referring now to the drawings with more specificity, the preferred systems and associated methodologies according to the present invention primarily concern computer-based blockchain-enabled crypto asset type systems operable within a computer network environment as exemplified by the Internet or the world wide web for allowing a user to control how advertisers may access a user's personal data; for compensating a user with crypto assets or currency in exchange for social amplification via social applications with a remote service layer; and made optionally made operable in concert with a smart contracts for tracking asset or coin allocation in a two party agreement with a public portion, and with a song list generation algorithm used to control the expansion of the crypto asset or coin supply.

Referencing FIG. 1, the reader will there consider a blockchain-enabled system for allowing a user to control how advertisers access their personal data, with a remote interaction layer that operates to mimic current advertising agency expectations. A blockchain-based or blockchain-enabled smart contract is generally depicted and referenced at 1. While these specifications incorporate language associated with or exemplified by ethereum smart contracts, it is contemplated that the systems according to the present invention could be built on any form of blockchain-enabled system.

The system depicted in FIG. 1 preferably comprises a smart contract (1) ethereum, vernacular for an extendable and customizable blockchain dataset. The blockchain data set or smart contract (1) acts as a mechanism for storing and releasing user data, giving users complete control of their own personal data, and providing a mechanism to release the data for economic consideration. The blockchain data set or smart contract (1) comprises or holds a transaction ledger (22), which transaction ledger (22) tracks transactions between advertising services (17) and the blockchain (1), providing a proof of transaction and cost, which would be used by the user to redeem monetary rewards offered by the advertising services (17) in exchange for personal data associated with the user, including user personal consumption data (2) and user demographic data (18).

A client device (3) exemplified by a tablet computer, desktop computer, smart phone or similar other computer type client device (3) is outfitted with a client-side mobile, desktop or browser application (40) (i.e. a non-transitory computer-implementable software application) enabling users to interact as at (4) with their smart contracts/block chains (1) in the following manners. The user may initiate (4) the smart contract or blockchain (1) by signing up via a client device (3) via the software-based operating application (40) thereby giving the user the sole right to write personal demographic data (18) and data release rules (5) to the blockchain or smart contract (1).

The client-side operating application (40) enables the user to set the data retention rules (5) determining what user personal consumption data (2) will be retained by or within the blockchain (1), and for what duration. The user personal consumption data (2) comprises personal consumption data typified by purchase data, search data, and media content consumption such as videos watched, and music played, etc.). Further, the application (40) allows the user to input user demographic data (18) which may include date of birth, zip code, gender, and other pertinent demographic data. The personal consumption data (2) is preferably updated as at (13) by a verified 3rd party service or content provider or merchant (12).

The user personal consumption data (2) and user demographic data (18) may thus be made available to $3^{rd}$ party service or content providers through whose services or content provisions, the user may run a network or web search or utilize a search engine typified by the Google search engine; purchase a product through an e-commerce platform typified by the Amazon Marketplace; watch a video via a video-sharing website typified by the YouTube video-sharing website; or listen to music via a music streaming service provider typified by the Spotify music streaming service.

A remote, computer-based, blockchain interaction service system (7) according to the present invention operates within the computer network and a server side operating application (41) to perform the following primary functions: (1) connecting $3^{rd}$ party service/content providers (12) to user blockchains (1); (2) validating $3^{rd}$ party data input or "writes" to the user blockchains (1); (3) optimizing consumption data references; and (4) enabling advertising-targeting service (17) to interact with the user blockchains (1). The remote, computer-based, blockchain interaction service system (7) preferably connects 3rd party service/content providers (12) to user blockchains (1) by mapping (9) Internet Protocol or IP addresses (10) used by the user as reported (11) by the client devices (3) for blockchain/smart contract identification (6).

The remote, computer-based, blockchain interaction service system (7) validates as at (15) 3rd party data input or reports (14) to the blockchain/smart contract (1) and comprises the only blockchain address permitted to write (16) validated user personal consumption data (2) to a user blockchain/smart contract (1), by taking the IP address (10) provided by 3rd part content providers via reports (14), and uses a reference database (8) to map (9) IP addresses (10) for blockchain/smart contract identification (6). The remote, computer-based, blockchain interaction service system (7) preferably optimizes consumption data references by either (a) creating a hash table with unique hashes for reported consumption, writing hashes to user blockchains/smart contracts (1), or (b) creating categories for consumption, and writing category identifications to user blockchains/smart contracts (1).

The remote, computer-based, blockchain interaction service system (7) would also enable advertising-targeting service (17) to interact with the user blockchain/smart contract (1) by providing mapping (19) between the device IP address (10) and blockchain identification (6), enabling the advertising-targeting service (17) to interact with the user blockchain/smart contract (1) to receive user personal consumption data (2) and user demographic data (18). If the offer (23) from the advertising-targeting service (17) meets the user's set price and rules for date release (5), the user blockchain/smart contract (1) releases the user personal consumption data (2) and user personal demographic data (18) as requested (20) by the marketing/advertising-targeting service (17). If the offer (23) from the advertising-targeting service (17) does not meet the user's set price and rules for date release (5), the user blockchain/smart contract (1) preferably responds as at (21), which response can be used by the marketing/advertising-targeting service (17) to craft an appropriate supplemental offer (23).

Social Amplification System

Figure 2:
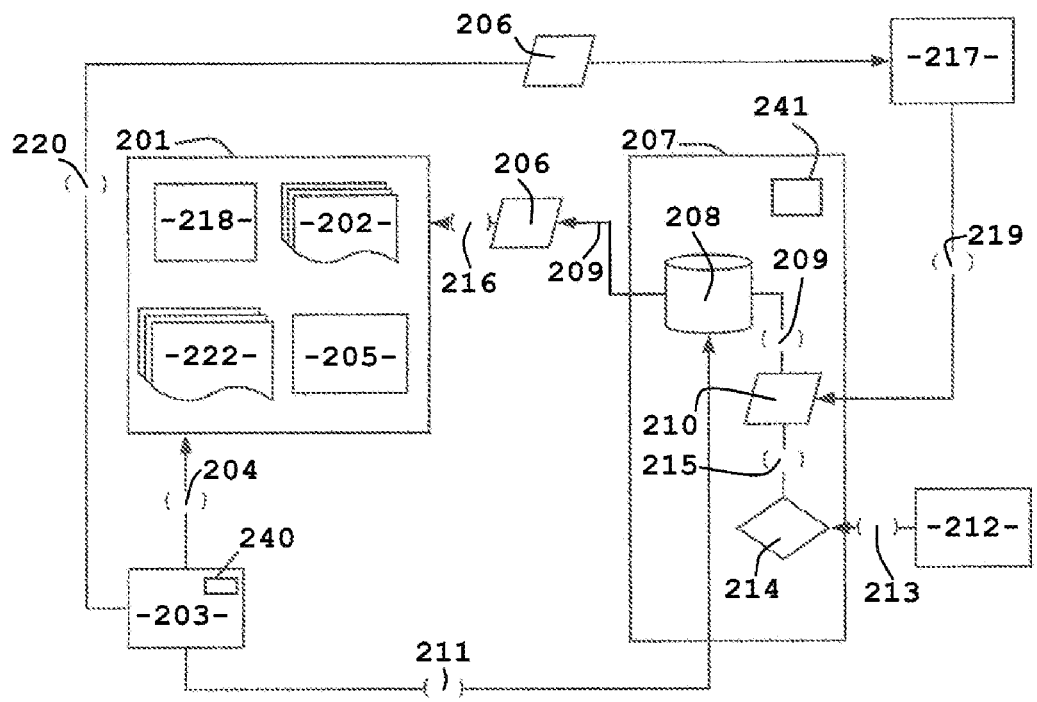
FIG. 2 is a flowchart diagram of a second system according to the present invention depicting a user blockchain in communication with a remove, computer-based service system and at least one client device.
Figure 3:
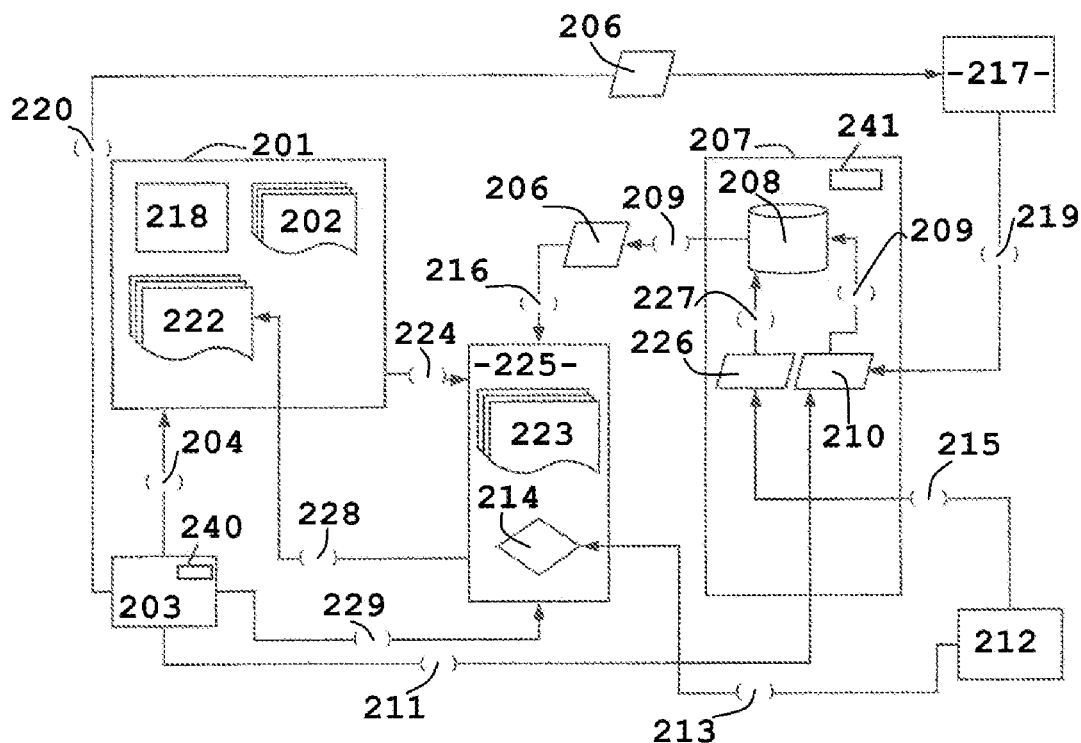
FIG. 3 is a flowchart diagram of a third system according to the present invention depicting a user blockchain in communication with a remove, computer-based service system and at least one client device.

A social amplification system according to the present invention is generally depicted and referenced in FIGS. 2 and 3. The social amplification system is a blockchain-enabled system that primary functions to allow a user to be compensated with crypto currency or a crypto asset in exchange for social amplification via social applications interacting with a remote service layer. The social amplification system according to the present invention is primarily built around a user blockchain-secured document/database, smart contract as at (201).

The blockchain-secured document/database, smart contract as at (201) is used to store a user's content amplification attribution data (202). The user's content amplification attribution data (202) comprises (a) a listing of social content shared by the user; (b) certain campaign identifications with which the social content is associated; and (c) the type of viewer or consumer interaction taken (e.g. a post view, content playback, or visit to merchant/vendor site). The client device (203) initiates as at (204) the user blockchain-secured document/database, smart contract as at (201) via a client side application (240) and in the process generates an influencer amplification identification that is linked to the user blockchain-secured document/database, smart contract as at (201) after it is created via a request (211) to the remote, computer-based, blockchain interaction service system (207) or remote service having a server side operating application (241).

The user blockchain-secured document/database, smart contract (201) preferably contains within itself four pieces of data, including user or influencer demographic data (218), payout rules (205), the user or influencer content amplification attribution data (202), and the transaction ledger (222). The user or influencer demographic data (218) may preferably be used to encourage users or influencers of or from a specific demographic to share more content by having the 3rd party service/content providers (212) the ability to specify rules for amplification payout as at (214), which rules for amplification payout (214) favor specific demographics by increasing payouts to users or influencers of or from a specific demographic. The user blockchain-secured document/database, smart contract (201) stores a copy of the payout rules as at (205).

An alternative social amplification system according to the present invention is generally depicted and referenced in FIG. 3. The alternative social amplification system according to the present invention releases as at (213) the amplification campaign as an amplification campaign blockchain (225) preferably in the form of a smart contract, with each qualified share reported as at (216) to the amplification campaign blockchain (225), which in turn registers as at (215) payouts for valid amplification events based on rules for amplification payout (214) set at the initialization of the user blockchain-secured document/database, smart contract (201).

The user blockchain-secured document/database, smart contract (201) may be referred to as a campaign contract in that it preferably contains a reference to the content that should be amplified according to the campaign. Payouts are registered by linking as at (209) the user or influencer amplification identification (210) with blockchain identification, which identifications can be one and the same, depending on how a reference to the user blockchain-secured document/database, smart contract (201) is designed). Payouts are registered by way of the remote, computer-based, blockchain interaction service system (207) into the campaign smart contract provided the smart contract contains a reference to the user blockchain-secured document/database, smart contract (201). The reference to the influencer block chain (201) is used to register a transaction into the campaign blockchain ledger (223), and the transaction payout is determined by payout rules (214).

The campaign blockchain (225) duplicates the transaction by sending a validated transaction registration request (228) to the influencer blockchain (201). The influencer blockchain (201) is then used to determine capital distribution (224) based on contract capital allocation determined by the payout rules (214). Payout would be claimed by registering a transaction in the influencer blockchain ledger (222) indicating capital distributed to the user or influencer in exchange for earned amplification credits/tokens registered in the influencer ledger (222). A client device (203) likewise interacts as at (229) with the campaign blockchain (225) to present to the user or influencer the estimated payout per share or amplification type and the content that should be amplified.

The reader will note that the rewards or tokens according to these specifications may not be preferably classified as currency or as securities since the rewards/tokens created by the invention is built comprise more flexibility depending on the class of reward/token owned. At times, the reward/token will function akin to frequent flyer points as derived from listening to the music, consuming other media content, or as derived from consuming advertising/marketing materials, and thus do have the ability to buy goods and services within the, sports, music and entertainment industry. The rewards/tokens may, however, be traded on an exchange and represent ownership participation in a song's royalties or similar other royalties deriving from media content. In this last regard, the rewards/tokens according to the present invention may qualify as a commodity or even a security depending on how the reward or token is acquired.

Another alternative social amplification system according to the present invention is generally depicted and referenced in FIG. 2. According to the social amplification system depicted in FIG. 2, the remote, computer-based, blockchain interaction service system (207) holds the payout rules (214), which are then duplicated to the user or influencer blockchain (201). The payout rules (214) are registered by 3rd party service/content distributors (212) via a request (any request sent via the IP protocol) (213) to the remote, computer-based, blockchain interaction service system or remote services (207).

This request (213) registers the campaign identification (226), amplified content, and payout rules (214). The remote service (207) then registers as at (215) a payout (216) for valid amplification events by using the user or influencer identification-to-blockchain mapping as at (209) as stored in the blockchain mapping database (208) in communication with the user or influencer block chain ledger (222), taking into account payout rules (214). Calculation of payout may require the remote services (207) to retrieve from the influencer block chain (201) demographic data (218) to calculate payout.

Crypto Asset to Cash Conversion

Figure 4:
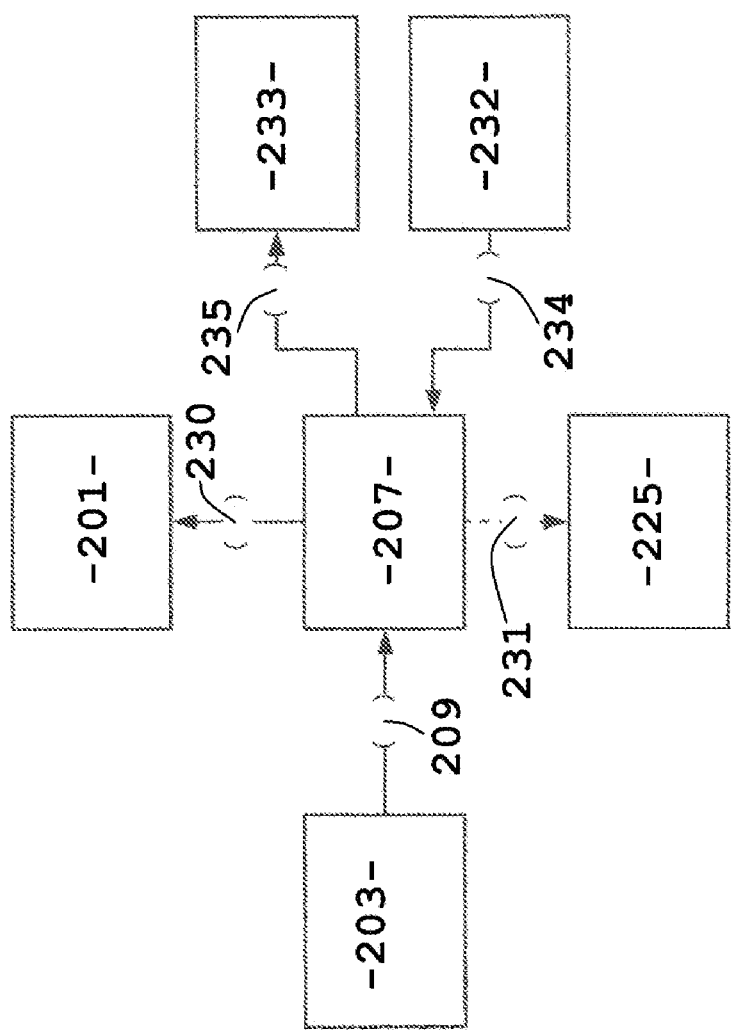
FIG. 4 is a flowchart diagram of a fourth system according to the present invention depicting crypto asset to cash conversion payout arrangements.

Comparatively referencing FIGS. 2 and 3 in conjunction with FIG. 4, the reader will consider the user has the option convert their amplification tokens/credits for cash or other forms of rewards. In the case of a cash conversion, the client device (203) puts in a request as at (229) to the remove service (207) to convert a specified number of tokens, and the remote services (207) retrieves as at (230) the registered tokens from the user or influencer blockchain (201). If the system variant of FIG. 2 is used then the remote service (207) will validate the request from the client device (203). If the system variant of FIG. 3 is used, then the remote service (207) will send a validation request as at (231) to the campaign blockchain (225).

If the request is validated, then a debit (234) to the financial institution (232) of 3rd party service/content providers may be sent for the amount of the payout. Similarly, a credit (235) is sent to the user's or influencer's financial institution (233). After credit and debit, the ledgers (222) and (223) of both influencer and campaign blockchains (201) and (225) are updated to reflect the payout. The conversion is determined by the payout rules (214). Capital for the campaign can be debited before conversion to ensure payout. Token conversion is not be limited to cash conversion. Cash conversion is simply an example of what is possible.

Tokens can be converted to rewards, or traded in exchange for other intangibles or tangible goods, services, or securities. The user or influencer blockchain (201) may further preferably comprise a participation ledger permitting multiple parties to participate in a user's or influencer's earned capital. This feature creates the possibility of creating a secondary market in which influencer participation in influencer coins could be bought and sold, and the possibility of an Initial Coin Offering or ICO for the user's or influencer's coin.

The client device (203) enables the user/influencer to easily promote the campaign content by enabling them to post as at (220) directly to their social network of choice (217) from the client interface. The client device (203) may utilize a Uniform Resource Locator or URL-shortening service to obscure the source of the link if the user or influencer does not want to be seen promoting content for payment. The post (220) may include URL's that redirect (e.g. an HTTP request code as at (303)) through the remote service (207), with the campaign id, and influencer id embedded into the URL (206).

The remote services (207) use the campaign identification (226) and influencer identification (210) and a redirect URL to validate the amplification event and register such events (215) with either the campaign blockchain (225) or within the remote service (207) depending on the system variant used. The service would redirect the consuming to the campaign content. The type of user engagement would be implied from the URL destination. If it is registered to a post image, then it is registered as a view. Video consumption may be registered as a playback request, and a URL redirect to a store would be credited as an acquired customer.

Crypto Music/Media Content

Figure 5:
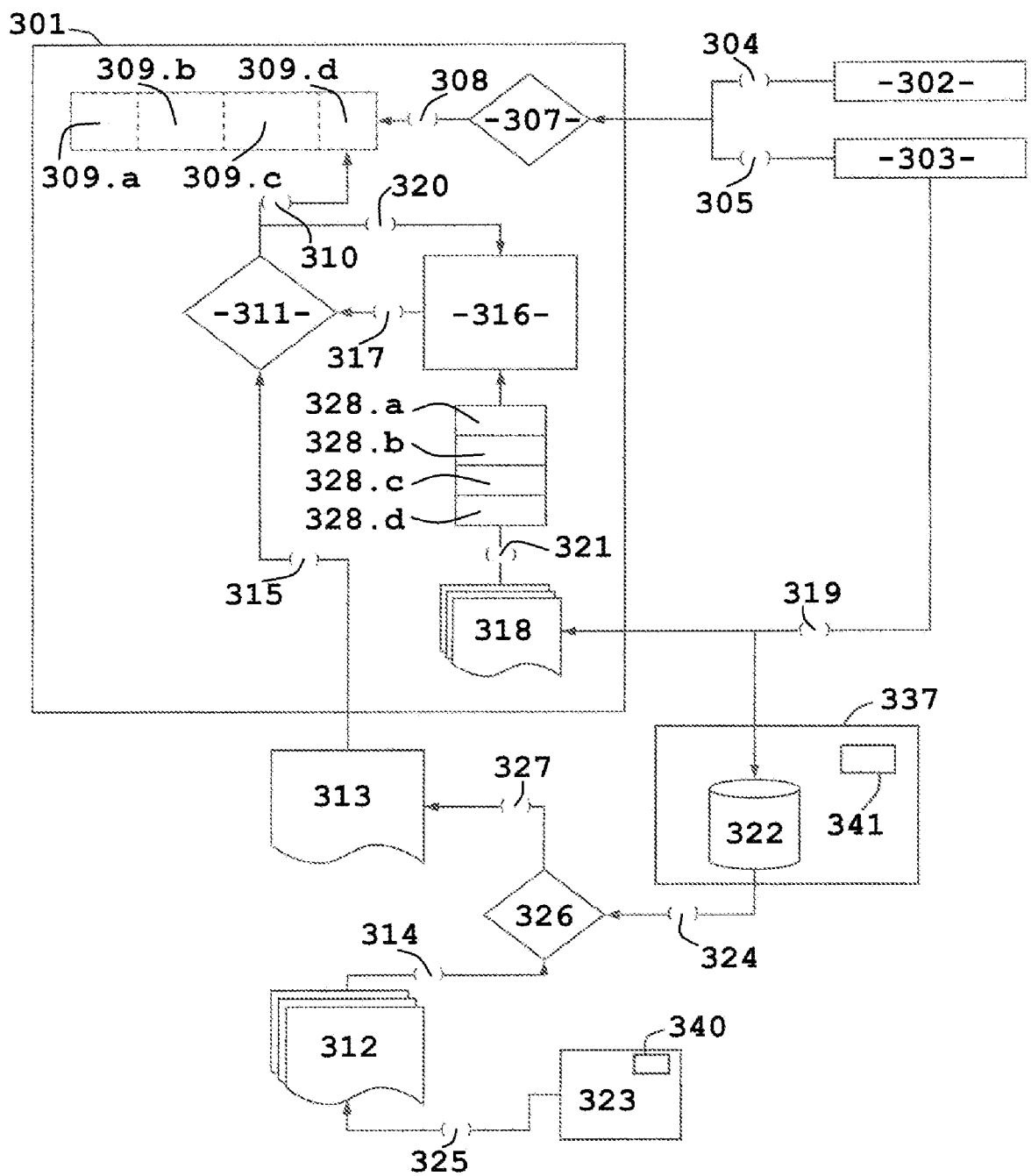
FIG. 5 is a flowchart diagram of a fifth system according to the present invention depicting a user blockchain in communication with a remove, computer-based service system and at least one client device.

Referencing FIG. 5, the reader will there consider the present invention further provides a blockchain-enabled system operating with a smart contract enabled to track coins allocated in a two-party agreement with a public portion, with a song list generation algorithm used to control the expansion of the coin supply. The system preferably comprises three primary components, including a blockchain secured/enabled smart contract, at least one client device, and remote service with interactions therebetween being governed by a non-transitory computer-implementable application (340/341).

The smart contract (301) is initiated as at (308) by the user if the rules (307) for initiation are met. On initiation, original coin allocations as at (309.a-309.c) are assigned. A primary partner portion (309.a), a secondary partner portion (309.b), a public portion (309.c), and an algorithmically expanding portion (309.d) may be originally allocated. To initiate the smart contract (301) one possible set of initiation rules (307) are required with a primary initiating partner (302) and a secondary initiating partner (303) submitting requests as at (304/305) to initiate the smart contract (301) with the same original coin allocations (309.a-309.c) for the smart contract (301).

The smart contract (301) preferably enables the generation of new coins with an algorithmic mint process (310). The algorithmic mint process (310) starts when the blockchain/smart contract (301) generates a secret or hidden ordered song (or other media content) list hash as at (316) as generated from a list of song hashes (318). The algorithm uses as at (321) and ever-increasing number of songs with every hash matched as at (317) to a client hash (313) submitted as at (315) by the client device (323) having a client-side operating application (340).

The secret or hidden hash complexity is preferably driven by two factors, including a first factor comprising the number of songs in the ordered list as at (328.a-d), and a second factor comprising the number of possible songs from a song hash pool (318) available to fit into each position in the list (328.a-d). Each position is randomly filled from the song hash pool (318). The complexity of the algorithm would in increase in the following manner:

x=number of songs in song hash pool
y=length of ordered song list
x^y=possible search space As more song hashes are added as at (319) to the song hash pool (318) by the secondary initiating partner (303), the search space that clients need to search to generate a new coin increases, and the length of the song list (328.a-d) increases with every newly algorithmically minted (310) coin. As song hashes are added to the song hash pool (318) by the secondary initiating partner (303) they are also added to a database (322), they are preferably mapped to 3rd party provider data. In this regard, the reader is directed to U.S. patent application Ser. No. 14/099,348 and U.S. patent application Ser. No. 15/305,977 upon which applications the present specifications build.

The system may alternatively operate with a single initiating partner, in which case all functions of the partners (302/303) would be executed by a single entity. The system may further operate with multiple secondary partners, each receiving an original coin allocation determined by the primary initiating partner (302), and which allocation is determined by the number of participating secondary partners (303). The smart contract (301) may further be used to pre-sell rights to music (as in PSL rights) or otherwise select assets to a right of access, which right of access is resalable. The original coin allocation may be sold to 3rd parties, while the new algorithmically generated coins would be given out based on the music mining algorithm as loyalty or rewards coins. Algorithmically generated coins may be of a different class than the initial offer (308), representing different levels of loyalty rewards or rights of access, including early access to concerts, VIP lounges, live chat access etc.

The value of the initial coin release (308) and optionally the algorithmically generated coins would be backed by the savings derived from the smart routing systems as described more fully in U.S. patent application Ser. No. 14/099,348 and U.S. patent application Ser. No. 15/305,977, owned by the author of these specifications and upon which the present specifications build. A mobile, desktop or web client device (323) allows the user to create as at (325) playlists (312) which would serve as the basis for song order hash generation (314). The client device pulls as at (324) the song hashes from a smart contract song hash pool (318) from a reference database (322), and uses the playlist structure (312) and the song hashes from the song hash pool (318) stored in the database (322) as inputs (314) to an ordered song list hashing algorithm (326). The client device (323) generates as at (327) an order song list hash (313) that is then submitted as at (315) to the smart contract (301). The value of the initial coin release (308) and optionally the algorithmically generated coins may also be preferably backed by contextually targeted advertising placement(s).

If the client device (323) submits an ordered song list hash (313) that matches (317) the Secret ordered song list hash (316), a new coin is generated via the mint process (310), and a new and more complicated ordered song list hash is generated as at (320). A remote service (337) having a server side operating application (341) provides and maintains a cross provider reference database (322), which would map media provider content to the song hashes in the song hash pool (318) using either a metadata mapping or audio finger printing mechanism as described more fully in U.S. patent application Ser. No. 14/099,348 ('348 Application) and U.S. patent application Ser. No. 15/305,977 ('977 Application) authored by the inventors of these specifications and upon which the present specifications build.

Social Stream References

Figure 8:
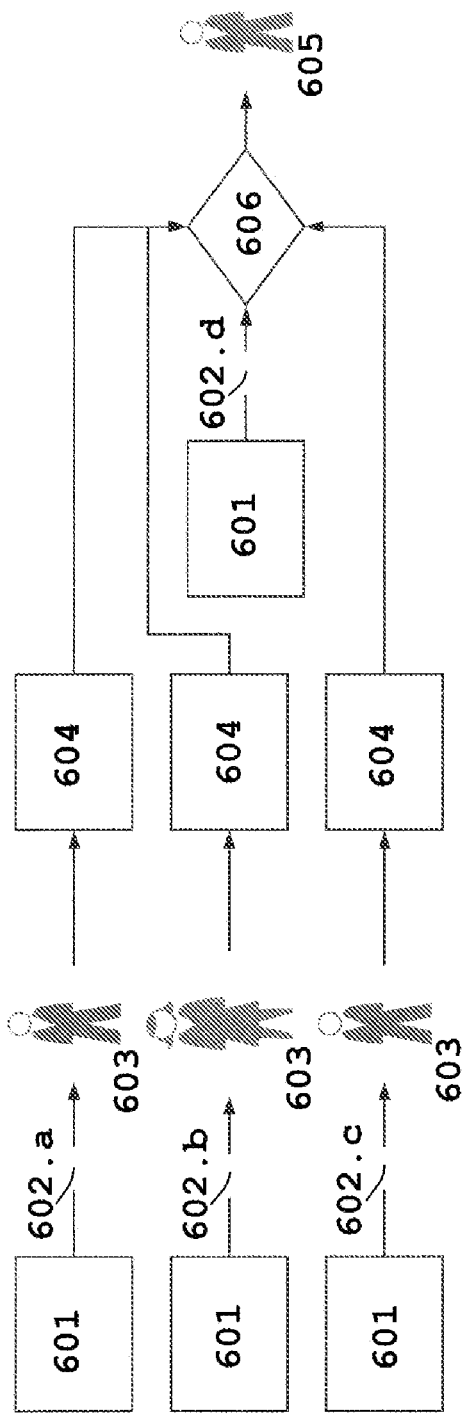
FIG. 8 is a flowchart diagram of a broadcast streaming scenario enabled by a Digital Social Recorder or DSR system according to the present invention.

A Digital Social Recorder or DSR system according to the present invention allows a user to comment and engage with live or on demand broadcast content to be registered in a centralized manner, allowing a user to see social commentary related to time accurate overlay data throughout the whole broadcast as well as specific portions of either a live or on-demand broadcast. The DSR system makes this possible by using a video search system that permits the searching of thousands of video hours within seconds. To help demonstrate the system and its result service, the reader is requested to imagine a scenario as depicted in FIG. 8, in which a sports broadcast as at (601) is being transmitted via three different networks or different network access points or legally compliant content sources or access methods as at (602a, 602b, 602c), to three different users or people as at (603) as exemplified by cable, satellite, or streaming providers.

Each of the users (603) tender social posts regarding the broadcast with a video and associated comment as at (604). The DSR system allows a user as at (605) viewing through the DSR system (606) to see the same broadcast (601) through his or her network or legally compliant content source or access point of choice (602a, 602b, 602c) with the social comments generated by users (603), at the exact time in the broadcast that inspired the commentary. If the broadcast is live, the user (603) is able to view previous portions of the broadcast with social content layered in, and if the broadcast is on-demand, the user (603) may view social commentary layered in as the user(s) (603) watch the broadcast.

The present invention may thus be said to essentially comprise a Digital Social Recorder (DSR) system operable within a computer network environment for allowing (a) a series of users to comment and engage with a live or an on-demand broadcast content to be registered in a centralized manner, and (b) the series of users to see social commentary related to specific portions of either the live or the on-demand broadcast. The DSR system according to the present invention comprises a remote computer-based service system within the computer network environment; a video indexing and search system co-operable with the remote computer-based system; a series of client devices for enabling the series of users to interact with the remote computer-based system; a non-transitory computer-implementable application implementable via the series of client devices and the remote computer-based service system for enabling the series of users to initiate social commentary atop select video content via the series of client devices; (b) input personal demographic data and data release rules to the remote computer-based service system; and (c) set data retention rules.

The remote computer-based service system provides and maintains a cross provider reference database for mapping media provider content to media content hashes within a media content pool via either a metadata mapping mechanism or a media content finger printing mechanism. The video indexing and search system is co-operable with the remote computer-based system, the video indexing and search system permits the searching of video content via the remote computer-based system. The series of users are able to view through the DSR system the same broadcast through a legally compliant content source of each user's choice with social commentary generated by users being communicable to other users simultaneously. Each user is able to view previous portions of the broadcast with social content layered in if the broadcast is live, and each user being able to view social commentary layered in as the user watch the broadcast if the broadcast is on-demand.

Video Indexing

Figure 6:
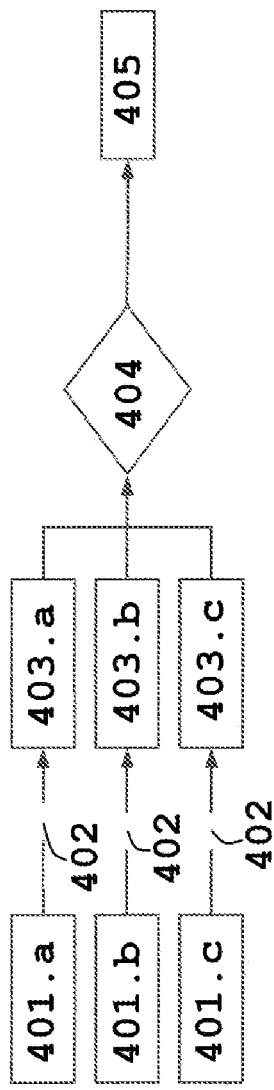
FIG. 6 is a flowchart diagram of a broadcast stream indexing system according to the present invention.
Figure 7:
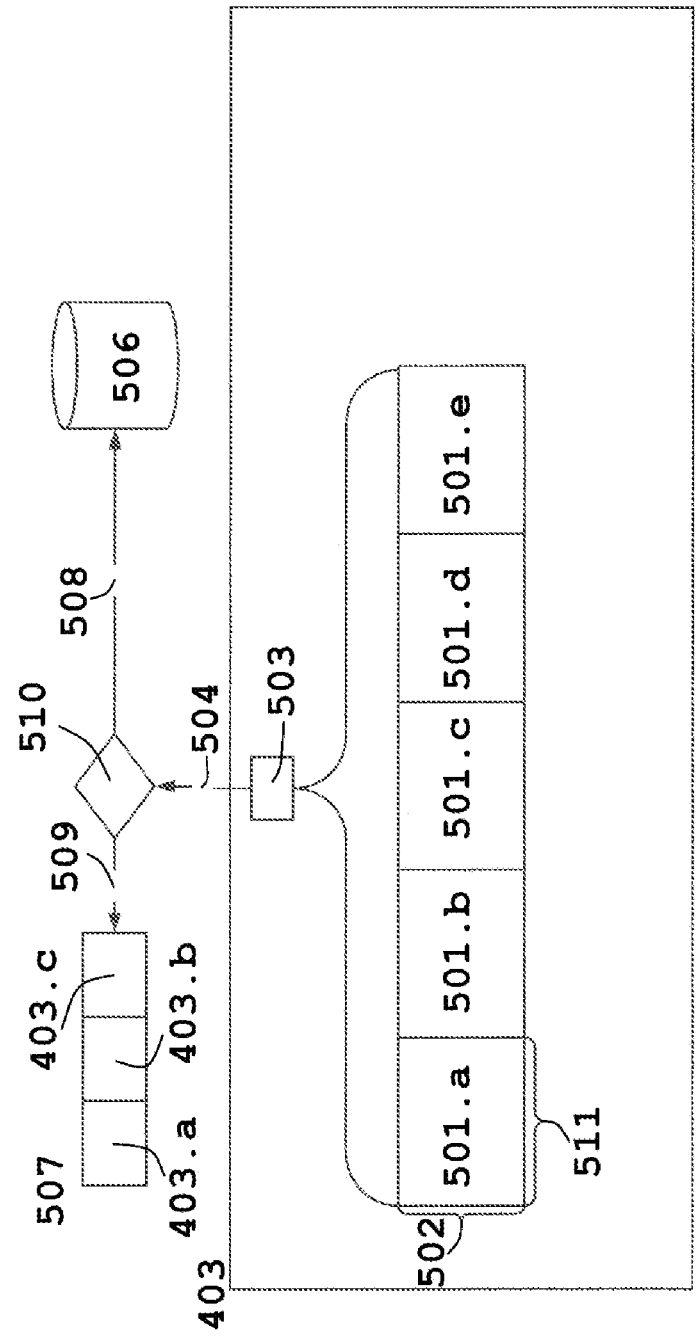
FIG. 7 is a flowchart diagram of a pixel indexing system according to the present invention.

A primary component of the DSR system (606) is a video indexing and video search system as generally depicted and referenced in FIG. 6. The video indexing and video search system maps a video back to its original broadcast. To accomplish this, the system begins by indexing broadcast streams whereby event broadcast streams from different networks (401a, 401b, 401c) are indexed as at (402) into pixel indexes (403a, 403b, 403c). A pixel index as generally depicted in FIG. 7 comprises a pixel matrix in which one of the video frames dimensions (either height or width) is held constant. In FIG. 7, the height of the frame is constant, while the width can fluctuate base on video aspect ratio. The full video is converted and stored in a pixel index which is a large pixel matrix that is stored in memory (e.g. backed up to disk storage). For example, if the system were indexing a video stream with a 16:9 aspect ratio with frame dimensions of 1024×576, the indexing process would extract each frame as an individual grayscale image (501a-e) resized to a height (502) of 9 pixels and width of 16 pixels. These images would then be compiled into a single large matrix with a height of 9 and a width of 16×(number of frames), assuming the stream duration is an hour and the frame rate is 30 fps, the width of the resulting pixel matrix (403) would be 28800 pixels (503).

The pixel matrix (403) contains the bit data for each pixel within the resized image. In the case of a grayscale image, the pixel matrix (403) would contain eight-bit pixel representations. Once this pixel matrix (403) is generated, it is appended as at (504, 509) to a pixel index as at (507). That system also identifies the start and end column of the appended pixel matrix (403) within the larger pixel index (507). The pixel index (507) is itself a matrix of concatenated pixel matrixes from several different streams with a unique identification which can be stored (508) in a database (506), along with the start and end column of the pixel matrix (403), stream identifying data, the aspect ratio, and frame rate of the original stream(s) (401a, 401b, 401c).

A possible variant of the system contemplates a mechanism to force all frames into a standardized aspect ratio, for instance 4:3, cropping out excess pixel data within a 16:9 frame. In such a system both the height (502) and width (511) of each individual matrix would be standardized. Such an alternative system has the advantage of a simpler search process. Once a stream is no longer live or after a sufficient amount of data has been gathered from streams that are known to be similar (for instance the same football game transmitted through different networks), the system utilizes a deduplication process (404) which creates references in the pixel reference database (506) for portions of the streams that are the same with references to a deduplicated pixel index (405), creating a many to one relationship between streams and pixel index.

Video Search

Figure 9:
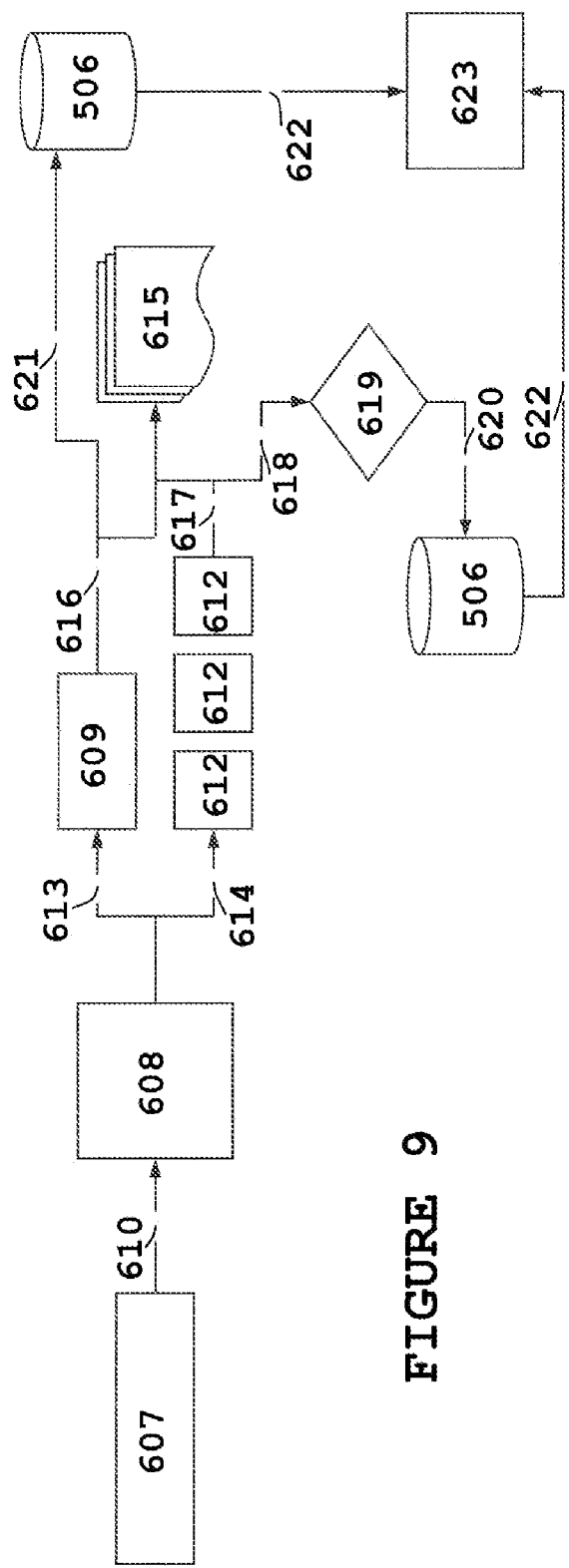
FIG. 9 is a flowchart diagram of a video search system according to the present invention.

Referencing FIG. 9, the reader will there consider a video search system according to the present invention with 2 possible system variants (613,614). The video search process according to the present invention commences with a video file (607) being submitted (610) by a client or a URL to a video file to the remote system (608). The video file is processed, and the resulting frames are extracted into the target image size. Following the above example, the image size would be 16×9. The system could possibly be developed into 2 different variants (613, 614), one in which the system produces a single matrix with a series of frames to query against the database (613). In this case, the first 30 frames of a video are processed and a concatenated pixel search matrix (609) is generated. In the second variant (614), several search matrices (612) are generated, one for each frame that will be used in the query (617). In both queries (616, 617) the system would use standard computer vision algorithms.

In this example, it is assumed a template matching of the OpenCV library is used to locate the position of the search matrix or matrices (609, 612) within a plurality of pixel indexes (615). The reader will note that the system is not constrained to a specific cv algorithm or finger print. The system could conceivably use any number of algorithms, even incorporate machine learning algorithms for search. Once the image recognition algorithm is run against the pixel indexes (615), the image recognition algorithm outputs data for identifying the row and column of the best match if running with a concatenated search matrix (609), or matches if running with multiple search matrices (612). Using this row and column data, the system then queries the pixel reference database (506) using the index identification and row and column of the best matches of the image recognition query (616, 617). The database then outputs the stream identification, the frame rate, and aspect ratio of the matching stream (621, 618).

Using this data, the system either identifies which stream appears most often (619) and with the highest score to find the best match if the system is being used with multiple search matrices (612). Otherwise, in the case that a single concatenated matrix is used (609), the stream identification with the highest matching score is considered the best match. Once a best match is identified (622), the system uses the starting column index of the best matching stream to calculate the position of the original video (607).

To calculate the position, the system takes the starting column position of the best matching stream with the pixel index (507), and subtracts that value from the starting column position of the best match to calculate the number of columns between start and match. Then, using the frame rate, and aspect ratio, the system calculates the size of each frame in the stream in terms of columns. In the example above, each frame is 16 columns wide. The number of columns is divided and the start of the stream is separated from the best matching column by the size of each frame and the frame rate to determine how many seconds from the starting time the match is located. The position data and stream identification are then returned as (at 623).

The present invention may thus be said to essentially provide a video indexing and search system operable within a computer network environment for searching video content by indexing video streams or files. The video streams or files come from different sources and are indexed into pixel indexes stored within a remote pixel reference database. The pixel indexes comprise row and column values denoting start frame data and end frame data for specific broadcast streams. Each pixel index is a matrix of pixels that are used as a target matrix in computer vision of CV processing enabling the use of a plurality of computer vision or CV algorithms for supporting video content searching. The video indexing and video search system commences when a select video file or a select video file URL is submitted by a select client device to the remote services.

One system variant of the present invention envisions the use of video search to synchronize broadcast/stream content (live or pre-recorded) from different legally compliant content sources (e.g. content creators and owners, broadcast networks and various distribution partners) (401*a-c*) permitting a user to select audio or video from a plurality of synchronized broadcasts/streams, and permitting a user to listen to audio from one network (401.*a*) while watching video from another (401.*b*) with social commentary overlays threaded in by any and all users as aggregated via a Vertigo branded synthetic broadcast system according to the present invention with the possibility of contextual targeted advertisement placement within the multi-thread broadcast/stream.

In this last regard, the system crawls social posts from whatever Internet-based source that has video/audio associated with commentary (within sports, music, and entertainment industries) and attaches contextually relevant advertisements to those broadcasts or streams as aggregated via the Vertigo branded system according to the present invention. Referencing the diagrams, the reader will note that multiple incoming broadcasts/streams may be parsed and searched by the DSR. The system, for example, contemplates stream to stream synchronization in order to enable a client to select video from one stream and audio from another for playback. The synthetic broadcast stream as aggregated by the Vertigo branded system according to the present invention may thus comprise a video with one or more audio streams, or a video with no audio stream.

Stream Social References

Figure 10:
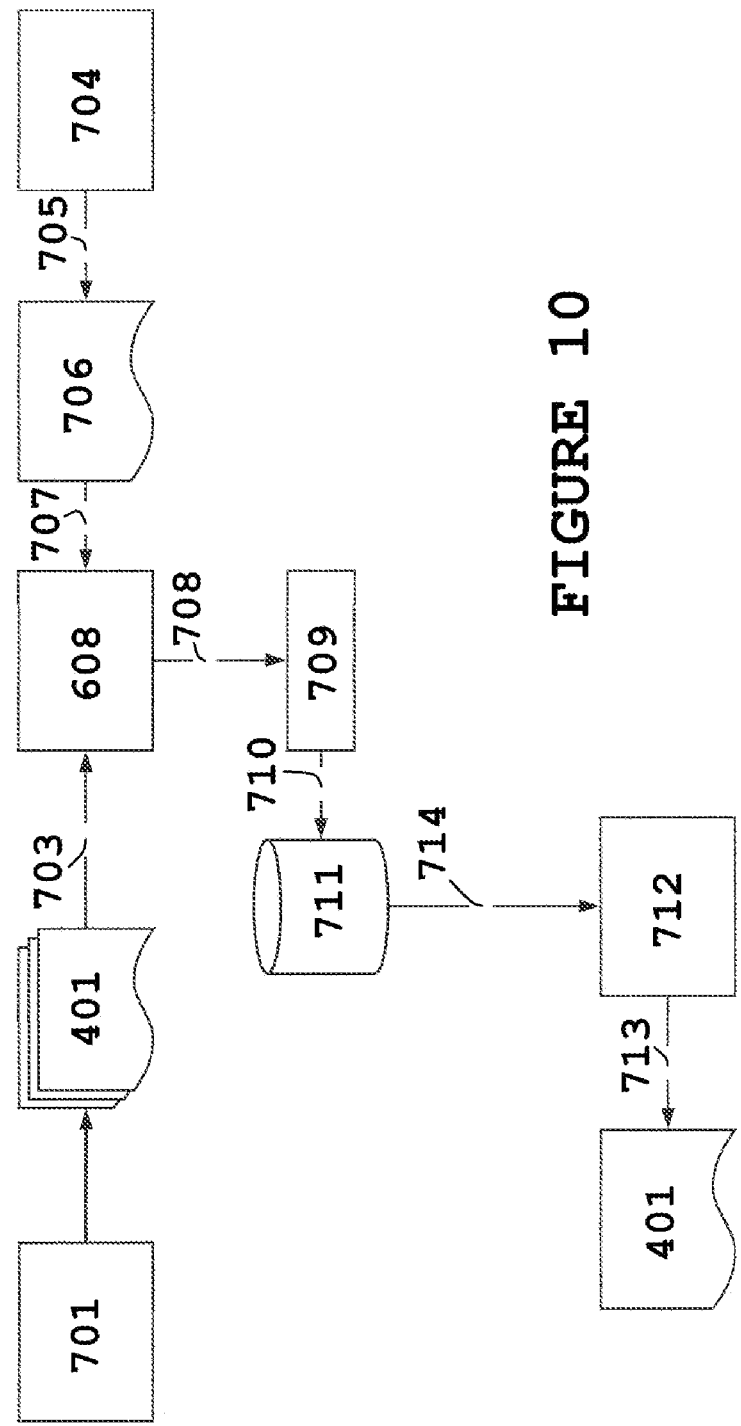
FIG. 10 is a flowchart diagram of a social references system with combined indexing and video search systems.

Referencing FIG. 10, the reader will there consider a social references system with the combined indexing and video search systems of FIGS. 6, 7, and 9 designated as combined system (608). The remote combined system (608) combines the indexing process (703) and video search process (707) to allow broadcasters (701) to index streams/content (401), which can then be queried by a web crawling system (704) that outputs (705) videos posted on social networks (706) and maps them to their original streams (708). These mapping maneuvers are then indexed (709) and stored (710) in a social reference database (711) which associates social posts with stream identifiers and start and stop positions for social commentary. A client (712) is then enabled to stream (713) the indexed stream or content (401) and retrieve social post data (714) from the social reference database, and overlay the social commentary on the video timeline, or display it as the video is played. The stream social reference system can operate apart from the video indexing and search solutions described above. For example, the stream social reference system can, for instance, utilize a system similar to that disclosed and described in US Patent Application Publication No. 2011/0302207 authored by Asmunds son et al. to accomplish video search and indexing, as constrained to a specific fingerprinting mechanism.

Talent and Performer Attribution

Figure 11:
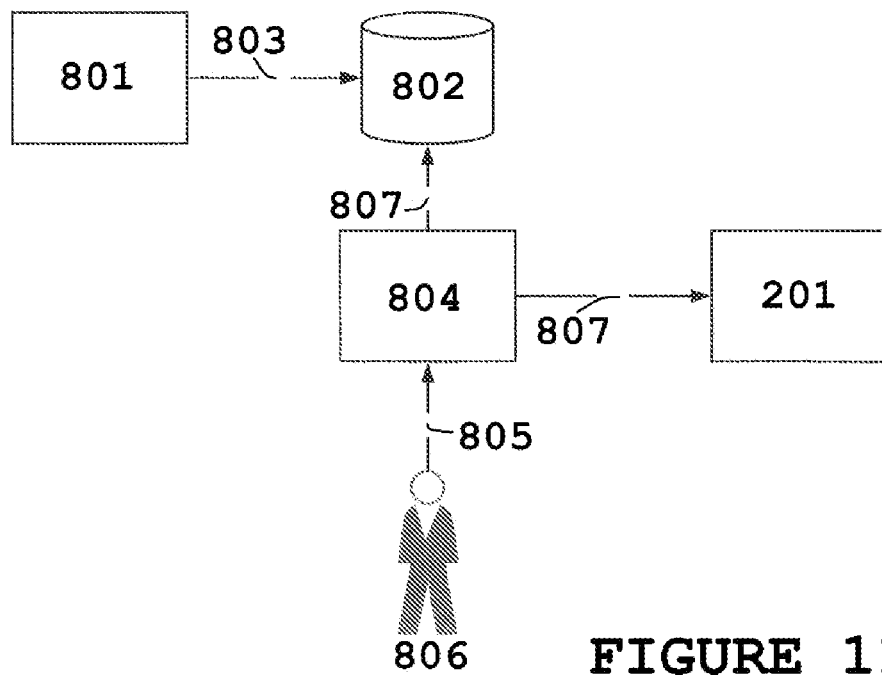
FIG. 11 is a flowchart diagram of a performer registration system according to the present invention.

Referencing FIG. 11, the reader will there consider an addition to the indexing system of FIGS. 6 and 7 in which attribution for talent and performers is added to a reference data in order to facilitate payout via a smart contract (201). In this alternative enhancement to the DSR system, it is possible to have data (801) regarding the primary performers (e.g. athletes or artists) (806) in segments of each stream input as at (803) and stored in a database (802) within the DSR system. The identification of primary performers may be used to enable performers (806) to register (805) with the system (804) to receive payout (807) for a portion of the advertising revenue using the smart contract (201) of the crypto currency social amplification system according to the present invention. The database (802) would be queried as a part of the video search system above at steps 618 or 621.

Synthetic Broadcast of Video Content

Figure 12:
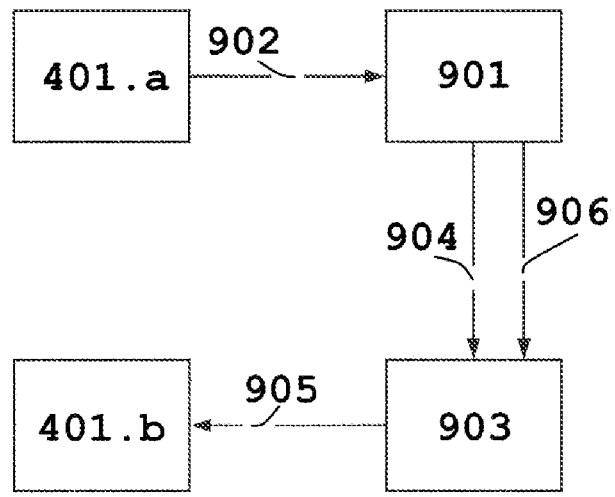
FIG. 12 is a flowchart diagram of a synthetic broadcasting system according to the present invention.

Referencing FIG. 12, the reader will there consider a synthetic broadcasting system according to the present invention in which a broadcasting client (901) is consuming (902) video content (401.*a*). The client (901) is in a session with a viewing or listening client (903), which listening client (903) receives routing and playback instructions (904) from the broadcasting client (901). The receipt of routing and playback instructions (904) enables the listening client (903) to use its own legal access point or legally compliant content source to retrieve (905) the same or similar stream (401.*b*) as the broadcasting client, and synchronize stream playback to the same position as the broadcasting client (901) based on the routing and playback instructions (904).

The broadcasting client (901) may likewise send secondary content (906) to overlay onto the stream, such as audio commentary, video comments, chat messages, or graphical overlays. The listening clients (906) are likewise able to engage with either chat messages or video comment if enabled by the broadcasting client (901). The system operates using TCP sockets to transmit routing and playback instructions, and utilizes a real-time video/audio protocol to enable live video and audio commentary overlays. Chat messages may likewise be sent over a TCP socket.

The reader will note that the media content-sharing system, upon which the present invention builds, may be said to comprise computer-implementable functionality for (a) establishing an instruction-passing first channel (exemplified by a TCP socket and/or TCP or UDP channel) to each content-consuming client via the computer network environment; (b) generating routing and playback instructions for governing playback of consumable legally-protected media content via a content-delivery second channel (exemplified by a TCP socket and/or TCP or UDP channel); and (c) passing the routing and playback instructions to the content-consuming client via the instruction-passing channel for sourcing consumable legally-protected media content to the content-consuming client from a preferred legal access point. The instruction-passing first channel and the content-delivery second channel may thus be considered concurrent channels as exemplified by a TCP socket and/or TCP or UDP channel for effecting concurrent data streams within the network environment. An event-handling micro-service maintains, manages, and synchronizes media and social content delivery within the network environment.

The '348 Application and '977 Application teach or describe certain systemic inventions describing in more detail the concurrent channels and providing for either Indirect or Direct source initiation of copyrighted media to be (smartly) routed to and consumed via a second Direct source of the same copyrighted media. One effect of such routing is to create a synthetic broadcast where the originating source of the media (e.g. an "Indirect initiating Source") is not actually sent through to individual media consumers but rather individual consumers' own separate legally compliant "direct" access point or content source of the very same copyrighted material is delivered instead.

An "Indirect Initiating Source" is defined as any source whereby the consumer is not "directly" selecting the specific media to be consumed but that media selection is coming from a second "Indirect Initiating Source" whether that source is a computer curated stream such as a digital "radio" provider or an individual live curator. Such (smart) routing or (smart) syncing of an Indirect source to a separate Direct legally compliant source uniquely enables a legal and compliant collaborative listening or viewing experience of media between two plus people when and where the access to the copyrighted material is derived from two plus separate legally compliant media sources of that material.

Alternatively, a "Direct Initiating Source" may be defined as a source whereby the consumer is "directly" selecting the specific media to be consumed and that specific media may be obtained from an optimal data resource location from at least two locations to which the consumer has legal access, which optimization protocol is based upon pre-defined user parameters such as price efficiency and/or data quality. Such (smart) routing or (smart) syncing of a such a request to a direct compliant source uniquely enables legal and compliant listening or viewing experience of media when and where the access to the copyrighted material is optimally derived from at least two separate compliant media sources of that material to which the consumer has legal access.

The present invention builds upon certain systemic means for rebroadcasting and group streaming. Rebroadcasting is basically a social feature that sees the current playback choices belonging to a member of a user group irrespective of content source and rebroadcasts those playback selections to other members of the user group which members may be within a select social circle, whether public or a private subset, or a geographically defined subset such that the select social circle can participate as members of the user group by attending to the content as initiated by the content initiator within the user group for the purpose of providing a content-based platform for social interaction.

The legally compliant content sources may be user-generated direct playback selections, or may be sourced from indirect streams that are either algorithmically generated or curated by another person or group. For example, an audio source may be originated from a 3rd party service and the audio signal for the rebroadcast does not have to originate from the user's own device or mobile application. The rebroadcast then provides a dialogue platform whereby the members of the group can in real-time, provide commentary by way of numerous means such as audio overlays, video overlays, or text commentary, which dialogue is intended to be based at least on the broadcast to which the members of the group are attending, thereby providing the members of the user group with both the content stream and means for social interaction based therefrom.

The group streaming aspects upon which the present invention builds provide certain additional social functionality in terms of a collaboratively curated content stream optimized for a group of people listening and interacting with the same media content. Each member of the user group naturally has certain individual preferences in terms of preferred content. The individual preferences submitted by members of the user group, for example, can input preferences going to preferred artists or actors, genres, albums, movies, moods, decades, etc. . . .

The group streaming feature upon which the present invention builds is primarily focused upon the optimization of a collaboratively curated content or media stream for members of a user group, using multiple initial and ongoing inputs such as liking, down-voting, up-voting, etc. The prior art does contemplate certain market-located solutions that offer individual curating and stream optimization based on an individual's input. The prior art, however, perceives a need for a system that curates and optimizes a group-based content stream based on multiple inputs, and for multiple users, each of whom consume content in a manner dictated by individualized preferences or parameters for sourced content derived from at least two different legal access points.

In other words, the present invention builds upon a social rebroadcasting system for enabling individual members of a user group to rebroadcast select content to other members of the user group, each of whom consume content as optimally sourced. The present invention further builds upon a group streaming system for enabling members of a user group to collaboratively curate content delivery subject to certain smart routing parameters that function to provide real-time synchronization of media content between at least two parties or members of the user group, which media content is sourced from at least two separate copyright or legal access points or legally compliant content sources or environments.

Real-time synchronization of streaming media content from at least one Indirect source to a Direct source and socialization of the smart routing and synchronization environment is governed by certain compliance or reporting means. The ability to source an Indirect content stream with an alternative Direct source (i.e. a personal, privately owned legal source NOT delivered from a peer-to-peer or computer populated network) with a governing compliance application in a social environment is believed foundational to the practice of the inventive subject matter upon which the present invention builds.

Suppose a content stream provider such as a digital radio provider or another person that shares or streams content is requested by a consumer to consume content from that content stream provider. The content stream provider and the consumer each have different legally owned access points or legally compliant content sources to the very same content that is to be streamed or shared. The consumer may have a legal right to a direction request for this content from the consumer's own source or library (i.e. a first legal access point or legally compliant content source) while the provider may stream content from a different source or library (i.e. a second legal access point or legally compliant content source).

Direct access to the content from the consumer's own library is thus believed more efficient and cost conscious than obtaining access to the content from the provider. If the content is thus sourced from a consumer's own library, this content delivery will or should have an impact on the compliance reporting by the content provider. The compliance appliance underlying and supporting the present invention accurately tracks and reports the resulting revenue generation for copyright holders.

By accurately tracking the content source for reporting purposes, the compliance appliance in support of the present invention can be utilized as centralized media managing/aggregating platform which enables tracking of a number of listeners or users at any given time (including real time) or any given place (i.e. venue). An artist (or advertiser) could utilize this tracking information to drive the delivery of additional content when the number of listeners/users meets a threshold number or crowd-based milestone (e.g. 5,000 or 10,000). For example, a live broadcast could be initiated when the number of listeners reaches 10,000 as a means to reinforce and/or enhance the listening activity, for example. Other parameters can also be tracked (e.g. number of dialogues/messages/likes, etc.) such as the number of pre-purchased or owned user-library tracks vs. third party streamer tracks for driving content purchases.

The prior art does not teach, fairly suggest, or provide this type of smart routing synchronization system for providing an optimally sourced broadcast to a social consumer group having certain smart routing means for routing select legally-protected content to individual members of the social consumer group each of whom have alternative and preferable source(s) therefor. The smart routing means upon which the present invention builds provide an optimally sourced broadcast ideally and patentably characterized by optimal source delivery of the select legally-protected content to the individual consumers of the social consumer group as prompted by either indirect requests, or direct requests.

The smart source routing upon which the present invention builds may be characterized by certain scenario types including local server-based delivery of either indirectly or directly requested streams; peer-connected server-based delivery of either indirectly or directly requested streams; or legal access point-based delivery of either indirectly or directly requested streams, which delivery bases are optimally selected based on pre-defined parameters set or defined by the user, such as price efficiency or audio/video quality.

The primary shortcoming of or perceived need in the prior art is that the various teachings do not teach how to map media content across providers. In other words, the prior art teachings typically instruct on how two devices may be able to share a stream from a single provider, there being no corresponding mechanism or means (a) for mapping media content across providers, or (b) for streaming the same media content from a second provider when the media content is identical to the media content provided by a first provider. There is no reference to metadata mapping algorithms, nor is there any reference to any fingerprinting mechanisms to identify media content, and properly attribute media content to or associate media content with owners thereof across content providers.

The Roberts et al. publication, for example, does make mention that two devices could conceivably share the same media content session, but the method taught by Roberts et al. would present an extraordinary security risk over a public network exemplified by the Internet, and thus Roberts et al. specifically limit their methodology to local area networks. Roberts et al. indicate that the mechanism for synchronized viewing would be a shared media session. This assumes the retransmission of copyrighted data from one device to another across the Internet. Such a system would only be legal if both devices belonged to the same user (accessing a common content library owned by the user).

The present invention is built upon systems that, by contrast, are operable to transmit and re-create a broadcast across multiple users each of whom have their own rights or legal access to media content libraries, and in some cases their own respective rights and legal access to the very same media content library (e.g. two users accessing the Spotify library via two separate legal access points, legally compliant content sources, or accounts). Extending the Roberts et al. to the systems upon which present invention is based would essentially result in mass copyright violations, and could be considered peer to peer file sharing.

Further, while Roberts et al. do appear to make mention of advertisement-tagging, they make no mention of relatively more important mechanisms for reconstruction of the music stream of a broadcast such as play or stop or seek or comment events. It is noted that while in-stream tagging is mentioned by Roberts et al. for the purpose of advertisement injection, such in-stream tagging is not explained, and not all media formats listed as supported by the invention support timed metadata, and the inventors do not specify how tagging would be accomplished without timed metadata. The nature of the data the Roberts et al. invention proposes to save is binary, (i.e. advertisement versus no advertisement), and the space needed to tag a file for such a small amount of data would be small enough to fit into the frame header of most formats (e.g. a single free bit).

The instructions needed for proper file attribution and mixing instructions to reproduce a live broadcast could potentially reach up to several bytes. Therefor the methods used for tagging that indicate binary advertisement existence (yes or no) cannot be used to inject routing and mixing instructions. It is neither clear nor obvious from the Roberts et al. teachings how one would accomplish the injection of events versus a simple advertisement indicator which can be as small as a set bit.

In this regard, it is believed that Roberts et al. fail to teach a routing and synchronization system operable with one or more data sources within a network-based media content playback environment for providing an optimally sourced media content broadcast to a consumer, which routing and synchronization system is characterized by comprising a computer-implementable application for generally synchronizing and routing consumable, legally-protected media content to the consumer from an optimal routing instruction fulfillment source as prompted by routing and playback instructions generated via a routing instruction generation source.

The optimal routing instruction fulfillment source according to the systems upon which the present invention is built is preferably affiliated with at least one, and optimally a plurality of legal access points or legally compliant content sources. The computer-implementable application is more particularly operable to generate the routing and playback instructions via the routing instruction generation source for governing playback of the consumable, legally protected media content via a content-delivery primary channel; establish an instruction passing secondary channel (in parallel to the content-delivery primary channel) to the consumer over an operable network infrastructure; and pass the routing and playback instructions to the consumer via the instruction-passing secondary channel for sourcing the consumable, legally-protected media content to the consumer from the at least one legal access point.

More particularly, the gateway server may register a sub-domain name to itself and then handles all requests to the sub-domain name from local client applications. In this case, when a request for the stream is made by a client application, the request is served by the gateway server. The gateway server begins this service by serving the stream from the remote content delivery network (via a content delivery first or primary channel). Once the stream begins, the gateway server may request a pre-recorded audio queue and begins caching the pre-recorded audio from a peer-to-peer network, remote content delivery network(s), or local sources. The gateway server may also preferably load the events queue from a remote database, which is constantly updated by a studio computer. The gateway server consistently receives updates of events while the stream is live (via an instruction-passing second or secondary channel).

In order to transition from the full studio mix to the live audio only stream, the gateway server may load both streams and only serve the full mix. In order to ensure that the gateway server and the mixing application have enough time to complete all tasks, the server may preferably start the stream 10-20 seconds from live data reception, creating a custom lag which would be used to create time for the system to execute the mixing and transition. The gateway server waits for an event bit in the full studio mix frame headers to transition to the live audio stream.

The gateway server preferably aligns the two streams at the event bit. This is done by matching the bit code following the event bit. If the bit code matches for both events, the events are considered matched, since only the last 10-15 seconds of a stream are searched. The 32 unique bit codes provide enough uniqueness to guarantee that the matched events are in fact identical. Once event bits are matched, the gateway server transitions from the full studio mix to the live audio mix at the frame in which the event bit occurs. Using this method provides a seamless transition from stream to stream with frame-to-frame accuracy.

The system of Roberts et al. dictates "best fit" media content delivery from a sole legal access point. The "best fit" aspect of the Roberts et al. system underscores the single legal access point criteria for the system. The "best fit" delivery of media content of Roberts et al. is essentially dictated by a Heuristic and thus the user does not have a choice in the selection of his or her preferred legal access point. The systems upon which the present invention is built, by contrast, allow the networked users of the system to choose their select legal access point or legally compliant content source, and in the social context, the legal access points or legally compliant content sources may be as numerous as the number of users within the network (e.g. each sourcing the media content from his or her own library or Spotify account). This is enabled and achieved by way of the parallel channel design of the system whereby instructions/directives are passed via the instruction passing secondary channel and content is delivered via the content delivery primary channel according to systems upon which the present invention builds.

The prior art fails to teach or suggest a media content-sharing system operable within a network-based media content playback environment comprising at least two computers for providing an user-preferred sourced media content broadcast to at least one broadcast-receiving consumer from a broadcaster consumer each of which have access to a first of the least two computers, which media content-sharing system provides concurrent data streams within the network environment for separately and respectively managing media content playback instructions via an instruction-passing secondary channel and media content playback via a content-delivery primary channel.

An exemplary fact scenario according to the systems upon which the present invention builds is as follows: a music recommendation and streaming service suggests or recommends a particular musical track (deliverable from the service provider's first legal access point or legally compliant content source) to a first listener based on the consumer's input. The particular musical track is already in the first listener's music library, and based on the first listener's preference for defaulting to playback of musical files from the first listener's own library (i.e. a second legal access point or legally compliant content source) in cases where there is overlap, the system enables playback of the particular musical track from the user's own library (i.e. the second legal access point) instead of accepting the streamed content from the streaming service (i.e. the first legal access point).

Continuing with this example, a second listener in the (social) group receives a shared music invitation from the first listener of this same musical track. The second listener has neither access to the recommendation service (i.e. the first legal access point) nor her own copy (i.e. a third legal access point), but does have access to a fourth legal access point in the form of an on-demand music streaming service provider. The VERTIGO brand music sharing application upon which the present invention is built operates to synchronize the delivery of the same music content to the first and second listeners from the second and fourth legal access points despite have originally received a prompt for the track from the first legal access point (the recommendation service).

The questionable copyright compliance aspects of the prior art teachings notwithstanding, the subject matter upon which the present system builds necessarily implements a data-routing compliance appliance in communication with all of the aforementioned separate legal access points or legally compliant content sources for providing (a) industry rights management (b) compliance monitoring and/or (c) compliance reporting of content delivery as delivered from any of the separate legal access points or legally compliant content sources. Copyright holders are increasingly sensitive to systems that avoid or frustrate copyright compliance via music sharing, and the present system contemplates proper copyright compliance accordingly.

Summarizing the prior art from the foregoing perspectives in contradistinction to the systems upon which the present invention builds, the prior art systems all envision social broadcasting by a mechanism that requires the redistribution of licensed content (emphasis added). In view of this, none of the prior art citations specifies how a system would map content across different content sources. In systems built on the premise of content redistribution, the solution would be obvious. The systems would be required to rely on file hashes, or URL's both of which can provide mappings to properly redistribute content.

A primary distinction is that in the systems upon which the present invention builds, the systems do NOT redistribute licensed content. Rather, the systems must provide a mechanism for mapping content from various legal sources even when the URL of the content may be different, and even when file formats and encoding of the actual content is different. Due to the assumed content redistribution in all of the prior art, each fails to disclose either a metadata mapping means, or audio finger printing means by which resource mapping can be established between content sourced from different legal access points or legally compliant content sources without redistributing the content (emphasis added).

To do so the prior art systems would be required had to disclose a means for mapping content by either a finger printing algorithm, or a metadata mapping means if the metadata is considered reliable. Mapping by itself, however, does not enable a system to create the effect of a social broadcast without redistributing licensed content. To enable the social broadcasting, the mapping means must be combined with a system that passes routing and playback instructions in combination with the references generated by the mapping means. The prior art citations fail to disclose these concepts as further described and claimed in U.S. Pat. Nos. 9,549,024; 10,116,616; and 10,198,777 and any contemplated extensions or divisional content filed therefrom.

In view of the foregoing, the authors of the present invention have provided a "token" tailored specifically for the music and entertainment industry that applies blockchain technology innovations as the means for (a) building upon prior art developed by the inventorship team to provide certain compliance and payment methodology; (b) fostering more direct incentives for cooperation between entertainment providers and their fans both individually as well as in groups, as well as any brands wishing to reach these individual fans or groups of fans by tracking and tying rewards or payments to the Fans for consumption and sharing behaviors; and (c) fostering more direct incentives for cooperation between entertainment providers and their fans both individually as well as in a group, as well as any brands wishing to reach these individual fans or groups of fans or the artists or athletes these fans pay or give attention to by tracking and tying rewards or payments to the Artists and/or Athletes and/or Talent.

The present invention centrally contemplates a compliance and payment system via blockchain tracking and distribution of any revenues derived from cost savings provided to terrestrial, satellite or digital radio broadcasters back to music rights holders and other related groups these rights holders would like to incentivize using the token as a reward for listening or payment for industry services to the rights holder including but not limited to any Performance Rights Organizations (PROs), Record Labels, Publishing Companies/Administrators, Performing Artists, Song Composers, Song Producers, Managers, Agents or any fractional rights holders or owners who would hold claim against any such revenues. Further, the present invention contemplates a compliance and payment system via blockchain tracking and distribution for revenues resulting from brands looking for ways to reach consumers of entertainment media via the Smart Routing Synthetic Broadcast (SRSB) systems or environment(s) developed by the inventorship team, as referenced above, including (a) revenues from advertisement placements within the SRSB; and (b) programmatic placement of advertising tailored to the individual consumer within the environment regardless of the specific entertainment content being digested where the advertisement is targeting the individual and not those watching or listening to specific entertainment content.

As stated, the present invention further contemplates the fostering or more direct incentives for cooperation between entertainment providers and their fans both individually as well as in a group (e.g. via crowd based milestones), as well as any brands wishing to reach these individual fans or groups of fans by tracking and tying rewards or payments for (a) fan/consumer consumption of an Artist, Athlete or entertainment provider's content; (b) rewards for the amplification of said fan/consumer consumption activity; and (c) rewards/tokens for exclusive access rights rather than financial reward or participation.

In connection with fan/consumer consumption of an artist, athlete or entertainment provider's content, fans or a group of fans participate with the artist or entertainment provider's revenues from both the content itself as well as third party brand or advertiser incentives. Individual fans or consumers or a group of fans with crowd-based milestones may be rewarded for consuming the entertainment content within the SRSB environment optionally within the DSR environment (as specified above). Further, brand-based rewards and incentives may be paid out to either individual fans/consumers of entertainment content or a group of fans with crowd-based milestones. These consumers may be offered incentives for purchasing decisions including but not limited to time based purchasing decisions. As indicated, rewards/tokens may provide exclusive access rights rather than financial reward or participation. Such access rights earned via the SRSB based environment or the amplification to others within the SRSB environment could include such things as: (a) the first right to buy tickets to an event or exclusive reserved VIP seating access; and (b) meet and greet the artist either physically or digitally where a SRSB environment exists to the content of that artist.

The present invention further contemplates fostering more direct incentives for cooperation between entertainment providers and their fans both individually as well as in a group, as well as any brands wishing to reach these individual fans or groups of fans or the artists or athletes these fans pay or give attention to by tracking and tying rewards or payments to the artists and/or athletes as the artist or athlete is listened to or watched by the Fans/consumers separately and distinctly from any contracts those Artists or Athletes have with the originating entertainment provider and content owner where fans or a group of fans direct the consumptive activity. In other words, fans or consumers themselves participate, or if required, direct their own participation in performance consumption relative to the artist or athlete based upon that artist's or athlete's performance. Attention to the performance is given by the fans from any and all available revenue sources including but not limited to the entertainment provider's revenues from both the content itself as well as third party brand or advertiser incentives or secondary and amplification on social media.

Payments made to an athlete from sources above and below may be based upon any algorithm that involves their actual performance in any single game or season or career at any single team or career spanning multiple teams including any fantasy sports leagues and scores. Payment may further be based upon or incorporate (a) the clearing of any odds or spreads by professional odds makers or legal gambling environments; (b) any method for rewarding amateur athletes immediately and/or upon reaching pro status where laws forbid payments prior using any algorithm that involves their actual performance in any game or season.

The creation of special savings and vesting accounts are further contemplated according to the present invention for collecting compensation for such cases where (a) an amateur athlete may not be legally able to receive remuneration directly at the point in time the funds are available had they been legally allowed to receive them; (b) the creation of the same special savings and vesting accounts to reward underpaid professional athletes based on unexpected upside performance not reflected in their original contracts and/or amateur or pro athletes upon career ending or compromising injuries where such compensation can originate from a pool based upon the team that they played with at the time of injury or is directed to or funded by any tethered or related insurance contracts insuring the athlete's ability to perform in order to help make more affordable insurance contracts for athletes and entertainers based upon the following:

Individual fans or consumers reward the artist or athlete for consuming the entertainment content within the SRSB or DSR or secondary social media environments. A group of fans with crowd-based milestones for consuming the entertainment content within the SRSB or DSR or secondary Social media environments involving or including the artist's song or athlete's performance.

Individual fans consuming advertising content with the SRSB or DSR or secondary social media environments. A group of fans with crowd-based milestones for consuming the entertainment content within the SRSB or DSR or secondary social media environments involving or including the artist's song or athlete's performance.

Individuals or groups consuming SRSB or DSR or secondary social media content via the DSR functionality.

Brand based rewards and incentives paid out to artists or athletes based upon any algorithm that considers the performance of the artist or athlete and/or the inclusion within that algorithm of either individual fans/consumers of entertainment content or a group of fans with crowd based milestones offered incentives for purchasing decisions including but not limited to time based purchasing decisions.

The present invention further contemplates the use of a new type of fan reward card or account that is tethered to an open set of rewards and is capable of tracking purchasing behavior of both individual fans of an artist or entertainment entity as well as groups of fans at the moment(s) of purchase in order to either accumulate rewards or use reward points for the purchasing of goods and services. This new type of fan reward card or account is tethered to an existing consumer debit card or bank account or mobile wallet and provides a mechanism for the real time reconciliation of time sensitive rewards by intercepting the authorization request from the point of sale (POS) of the participating brand/provider of goods and services wishing to incentivize a given group of fans or the acquiring bank partner of that brand/provider of goods and services. Reconciliation via such a secondary reward reconciliation process and gateway can match an advertised incentive with purchasing behavior and grant rewards based upon both individual as well as group purchasing activity, or pay using previously granted rewards.

The present invention further contemplates a ghost coin or token shielding the identity of the person being rewarded for the participation in all activities listed above so that fans/consumers of content can remain anonymous should they wish both to the entertainment provider or property as well as to the advertising brands or providers of goods and services while at the same time being highly targeted for their personal demographic, geographic, and consumption behavior. The objective of this ghost method of programmatic rewards is to maintain the efficiency and efficacy of personalization and product fit with an individual consumer of entertainment without that individual compromising their privacy and identity.

The continued transition of traditional broadcasts into parallel or asynchronous on-demand digital streaming access combined with the exponential growth of User Generated Content (UGC) will have new implications within the "Attention Economy." The Attention Economy is a term that recognizes the fact that there is now more content being created annually and daily than a consumer can consume within the scarce resource of their personal time to give attention. While consumer time spent viewing/listening to media has in the past been growing, the time consumers can give to media has now peaked even as media options continue to explode. Media sources and their distribution partners are now fighting for a greater incremental share of a finite level of available attention span.

Consumers can only give "attention" to so many entertainment options and with the exponential growth of User Generated Content ("UGC") now competing with traditional network or studio offerings, there needs to be a new way for brands, consumers and those that grab and maintain their attention to be rewarded and compensated. This is especially true given that within the emerging "attention economy," traditional media boundary lines are being erased as radio is not merely competing with music streaming services and music streaming competing with video streaming and video streaming competing with traditional TV/Cable but all are now competing with one another and UGC options for the same limited consumer attention span.

The specifications of U.S. Pat. Nos. 9,549,024; 10,116,616; and 10,198,777, upon which these specifications build, uniquely allow for a combined and mixed media experience where more than one media source can be compensated for the same attention span. One past example is the subject matter of U.S. Pat. No. 9,549,024 directed to smartly routing a radio broadcast to the listener's own private legal access point or legally compliant content source for the same content thereby allowing both the radio station and the music streaming provider to be economically rewarded for the same "attention span" of a shared consumer.

U.S. Pat. No. 10,116,616 further describes a system and method for allowing or enabling social users to also be combined into this combined environment which affords a legal way for UGC to socially amplify copyrighted music streams based upon each social participant viewing a live video and chat listening party or non-live video content (See also US Patent Application Publication No. 2019/0267042, also authored by the inventors of these specifications) combined with a real-time separate audio listen derived from the listener's own direct legally compliant music streaming source.

The foregoing specifications and depending claims seek to expand upon the foundational patent application specifications referenced above to include new methods for compensation to be derived from those participating or being streamed on both the consumer and content/talent side. The prior inventions are expanded upon here as well as are given definitions for the compliance and payment systems that allow for these new consumer experiences to be more fairly rewarded and allow for compensation to flow to those grabbing the attention of users of the inventive content. What may seem to be distinct inventions are most often interdependent given the unique media environment that the past and here extended inventions make possible. The following is included to help frame and color the nature of these new and extended claims through the means of telling an illustrative story as an example.

A new form of social influencer and former Clemson football player, Terry Puddle, takes advantage of ability via the present invention to overlay a Clemson Vs. Alabama football game with audio, video, drawings, slow motion and pausing effectively giving anyone the same tools as traditional sports commentators. Each viewer is getting the video feed from their own legally compliant content source (One is watching the game on an ESPN channel via DirectTV while another friend is online directly with ESPN) while Terry Puddle's social overlay and commentary is being created using his own Spectrum account and legal access point or legally compliant content source to the game.

Simultaneously, a group of friends that include Ace, an Alabama graduate and friend of Terry Puddle, is surrounded by Clemson fan friends since he is from the Carolinas. These friends are gathered together digitally from various geographic locations and legal access points to the game but they get to legally watch the game together and have given each other certain "screen rights" that allow each of them to have some control over each other's screens. They can text comments with one another or pop up into a picture in picture video and audio overlay resulting in a new form of social viewing party that acts as a TV version of Vertigo's current listening parties. As an influencer, Terry Puddle has locked his screen since thousands are tuned into his commentary laced live re-broadcast. Terry can still see the comments and re-share anything he wishes for the benefit of his followers as he chooses. Sometimes Terry even invites some of his fellow former teammates to join his live sharing and calling of the game with the group cast function.

Each of the friends and viewers including Ace also receive a real time social feed across the bottom of their screen from various DM and social media sources that each viewer has chosen to personally follow. They of course can all also re-share any of those posts with the rest of the friends watching the game. Depending on their view settings, each may also opt see the most trending comments from all viewers using the #hashtag for the game. Ace wants to see what his friend Terry is doing but as an Alabama fan he switches his audio source to the local radio call in order to "hear" Eli Gold, the voice of the Alabama Crimson Tide, who he can now hear perfectly in the background already in sync with the video broadcast. Ace's friends have no idea where he gets the insightful comments he shares via DM text thread throughout the game. Upon an unexpected turnover resulting in an Alabama touchdown, Ace, with the press of a button on his iPhone, sends an animated dancing "Acemoji" of himself morphed into a digital version of "Big Al," the Alabama mascot, dancing on a surfboard while riding a big red breaking ocean wave across the screen that crashes into and floods the Clemson end zone in a good natured "Fortnite-like" victory dance over his Clemson friend's screens.

An argument arises as to whether the touchdown was even valid and a pause ensues with privately controlled pause and slow-motion apart from that provided officially within the original ESPN broadcast. The timing of their game view is now off from the live feed but all social content and overlays are being collected and indexed to the proper video frame so that tweets and comments are still enjoyed as if in real-time even in the event a viewer was not able to start viewing the game on time.

That attention grabbing game winning score was made by a previously little-known player who recovered a fumble and ran it back for a touchdown resulting in Alabama advancing and winning the national championship resulting in millions for the school in terms of TV contract advances, stadium advertising rights and equipment endorsements from Nike. The little-known player, however, previously would have received nothing even though his performance both on the field and via social application after the fact captured the attention of the world of college football. His game winning play was shared millions upon millions of times online over the coming days. Terry Puddle's unique social overlay to the specific play was the one seen the most, even over the official game call from ESPN because of his uniquely funny facial reaction and stuttering in disbelief. Bama fans made a meme out his expressive reaction to the play also included.

Nike had a budget $X for that game but also wanted their ad spend to be targeted and timed for positive moments and to a particular demographic. What play that would be or even what game and who would get compensated, Nike nor any single media outlet could have known. Terry Puddle earned the most social/consumer side reward tokens from Nike based upon his social post resulting in so much extra exposure. The little-known player who will again fade slowly back into anonymity not expected to go pro and who was not even on a full scholarship also earned the most tokens from the player side.

This new type of brand "endorsement" not targeting any single player or even game but to the player and game that made the most memorable difference went into a unique savings account rewarding that player for igniting all of the positive attention. This resulted in either his past student loans being paid off or for his savings account reserved for his post play career as the spotlight fades. That Nike ad was, however, never shown to known Clemson fans during an Alabama score and/or negative Clemson moment. Clemson fans were, however, served several beer commercials during those rough times since Nike paid a premium to have its' brand seen by Clemson fans without being adjacent to Clemson first downs or scores.

Many privacy conscience Generation Z college viewers did not want their personal identities compromised. They took advantage of special perks and helped to create the targeted rewards for Terry Puddle and the unknown player by giving them so much trackable attention while they themselves remained anonymous via the "Ghost Coin."

Those "ghost" rewards were backed financially in this particular example mostly by Nike who wanted to rifle shoot them to the target demographic combined with the right positive game moment and resulting social amplification but Nike nor any previous platform could have known in advance what that game and resulting viral social moment would be and could not have known what specific player and social influencer would be most responsible for both the game moment as well as the social amplification. The play and/or social comment combination could have originated from any number of access points and social platforms tied into the interoperable Digital Social Recorder ("DSR") where it was repeatedly re-shared via a deep link to that moment on several other social platforms and news articles.

Those that missed the best social overlay moments or perhaps the entire game, can go back and forth in the coming days using the DSR that is agnostic to both each viewer's legal access points to the replay the video and/or audio of the game as well as being agnostic to the particular social media source used by those they follow who made comments about moments within the game. Consumers can have a collective post game discussion and anyone clicking into Terry Puddle's trending viral post can immediately be taken to that exact moment in the game within their own legal access point and then continue watching that game in full or in part for themselves. Even though many are now viewing a day later, those viewers can none the less also begin switching between secondary social overlay sources and view social comments as if experiencing in real time.

Days later, a highly followed professional ball player and celebrity inspired by the unknown player's performance, reposts the play again but this time with a song from Spotify that fits and the song becomes a kind of soundtrack to the moment. Millions more new viewers discover and watch based on both that celebrity's post as well as a thank you repost and shout out back from the famous music artist now being played in the background. Each new time that new repost with new parallel sound is viewed, it ALSO registers as a fully paid and charted spin/stream for that song and music artist who is now also trending. Each viewer hears the song from their own legal access point so Ace sees the re-share but hears the sound from Apple and not Spotify since that is his personal legal music access point. As a result of the secondary success of that new post and song choice, that song becomes several sports team's pre-game, get into the zone #GameBeforeTheGame song of choice. Fans watching a favorite athlete warming up on the field the following week wearing a set of Beats headphones, switch their social audio feed to what that athlete is listening to beat for beat since the athlete is live sharing but each listening viewer is hearing the song be routed from their own private legal premium music source and therefore each fan is registering a separate paid and charted spin/stream.

Beats headphones targeted token ad spend rewards those using beats or helping make Beats go viral. The artist who wrote and performed the song is now also paid at the highest on demand rate based on each viewer triggering a full interactive on demand song request each time from their paid music source even as they are also viewing the TV feed from a second source not affixed to the song. The result is 15× more money paid for the music on top of the fact that the song is now charting to number one, neither of which would have been possible had the same video and sound been allowed to be seen on an alternative platform as a single newly saved file not pulling together these actual broadcast sources and music from the viewer/listener's subscribed legal sources.

Even though all this "attention" started as a sports moment, it resulted in a music moment and now Terry Puddle, the re-sharing celebrity, the unknown athlete, the artist and even the largest fandom account of the music artist who's re-share of the second musical version was itself seen hundreds of thousands of times, all get paid from both Nike and Beats who could never have targeted nor predicted those moments and without the smart routing and social amplification with full interoperability and integrated tracking and payment methods could never have been possible.

Inspired by the success, Nike and Beats design a challenge with the fandom communities to reach certain participation and social hurdles with a "Battle of the Stans" challenge where this time tokens will go to each fan club/group that reaches the set milestone. The reward tokens are linked to provide access to an exclusive private listening party with Q&A with their favorite artist. On and on, multiple media outlets can now be included and rewarded with simultaneous attention span due to the interoperable mixing and smart routing of media based on each viewer and listener's legal sources and access points.

The invention of these specifications extends and improves upon past inventions allowing for the tracking of each view and listen without breaching privacy of those users and provide for the unique alignment of economic incentives and outcomes not possible within existing platforms or ad targeting methods. The present invention allows brands, media platforms, fans and influencers to participate in the attention and economic reward together regardless of each fan/viewer/listener's choice of Radio, TV, Music Streaming or social media commenting/camera platform of choice. These same platforms of choice are included and able to enjoy the economic benefits in both live and non-live environments using the interoperable Digital Social Recording system and re-Broadcast tools and payment systems according to the present invention.

While the foregoing specifications set forth with finer specificity a number of systemic embodiments, the specifications are believed to basically or essentially teach or provide certain blockchain-enabled crypto asset systems operable within a computer network environment for allowing (a) a user to control how advertisers access the user's personal data; (b) allowing crypto asset compensation in exchange for social amplification; and (c) tracking asset allocation as earlier prefaced.

Each blockchain-enabled crypto asset system according to the present invention may be said to essentially comprise a remote computer-based service system within the computer network environment, at least one client device for enabling the user to interact with a user blockchain, and a non-transitory computer-implementable application implementable via the at least one client device and the remote computer-based service system.

The remote computer-based service system of a first blockchain-enabled crypto asset system is operable within the computer network environment for connecting 3rd party service/content providers to the user blockchain; validating 3rd party input data to the user blockchain; optimizing consumption data references; and enabling advertisement-targeting services to interact with the user blockchain. Thee computer-implementable application enables the user to initiate input to the user blockchain via the at least one client device; input personal demographic data and data release rules to the user blockchain; and set data retention rules.

The user blockchain of the first blockchain-enabled crypto asset system provides a mechanism for storing and releasing user data giving the user control of the user's personal data and a mechanism to release the user's personal data for economic consideration. The user blockchain operates to hold a transaction ledger for tracking transactions between the advertisement-targeting services and the user blockchain and a proof of transaction being usable by the user to redeem rewards offered by the advertisement-targeting services in exchange for personal data.

The remote computer-based service system may be made operable to connect 3rd party service/content providers to the user blockchain by mapping IP addresses used by the user as reported by the at least one client device for blockchain identification. The remote computer-based service system may provide the only blockchain address permitted to write validated consumption data to the user blockchain by taking the IP address provided by 3rd party service/content providers, and using a reference database to map IP addresses for blockchain identification.

The remote computer-based service system is operable to optimize consumption data references by either creating a hash table with unique hashes for reported consumption, and only writing hashes to the user blockchain, or creating categories for consumption, and writing category identifications to the user blockchain. The remote computer-based service system thus enables advertisement-targeting services to interact with the user blockchain by providing mapping between at least one client device IP address and blockchain identification thereby enabling the advertisement-targeting services to interact with the user blockchain to receive personal user information provided a preferred targeted advertising campaign meets a set of rules within the user blockchain.

The user blockchain releases the personal data requested by the advertisement-targeting services if the preferred targeted advertising campaign meets the set of rules. The user blockchain may respond with an alternative targeted advertising request to the advertising-targeting service if the preferred targeted advertising campaign does not meet the set of rules. The data retention rules set by the user determine what personal consumption data will be retained by the user blockchain and for what duration, which personal consumption data may be updated by select verified 3rd party service/content providers.

The remote computer-based service system is configured to enable advertisement-targeting services to route targeted advertisements tailored to a user within a smart routing synthetic broadcast system or environment to the user based on personal user information provided and that the targeted advertisements meet a set of rules within the user blockchain.

Further the remote computer-based service system is configured to enable advertisement-targeting services to route targeted advertisements tailored to a user within a live social re-broadcast within the smart routing synthetic broadcast system or environment to the user based on the personal user information provided in the user blockchain and that the targeted advertisements meet a set of rules within the user blockchain.

The remote computer-based service system is also configured to enable advertisement-targeting services to route targeted advertisements tailored to a user based on the personal user information provided in the user blockchain and that the targeted advertisements meet a set of rules within the user blockchain within a Digital Social Recording System within the smart routing synthetic broadcast system or environment.

A blockchain-enabled crypto asset social amplification system according to the present invention is operable within a computer network environment for allowing crypto asset compensation in exchange for social amplification and comprises a remote computer-based service system within the computer network environment, a least one at least one client device for enabling the user to interact with the user blockchain and the remote computer-based service system and a non-transitory computer-implementable application implementable via the at least one client device and the remote computer-based service system for enabling the user to initiate input to the user blockchain via the at least one client device; and input personal demographic data.

The remote computer-based service system of the blockchain-enabled crypto asset social amplification system governs user content amplification attribution data input to a user blockchain, which user content amplification attribution data preferably comprises a listing of select content shared by the user, campaign identifications associated with the select content, and a type of consumer interaction. The at least one client device generates an influencer amplification identification linked to the user blockchain via a request to the remote computer-based service system.

The user blockchain blockchain-enabled crypto asset social amplification system provides a mechanism for storing and releasing user data giving the user control of the user's personal data, and a mechanism to release the user's personal data for economic consideration. The user blockchain operating to hold a transaction ledger for tracking blockchain transactions based on the user content amplification attribution data and being usable by the user to redeem rewards offered by 3rd party service/content providers in exchange for personal data.

The blockchain-enabled crypto asset social amplification system may operable around the use of user demographic data. The user demographic data is usable to encourage users of a specific demographic to share more by having the 3rd party service/content providers the ability to specify payout rules for amplification payouts to the users of a specific demographic. The user blockchain stores a copy of the payout rules for supporting the amplification payouts.

An amplification campaign blockchain is preferably released in the form of a smart contract with qualified shares being reported to an amplification campaign blockchain. The amplification campaign blockchain registers valid amplification event payouts based on a set of rules set at the initialization of the smart contract. The smart contract may preferably comprise a reference to the select content for amplification, the valid amplification event payouts being registered by linking an influencer amplification identification with a blockchain identification via the remote computer-based service system.

The amplification campaign blockchain duplicates transactions by sending a validated transaction registration request to the user blockchain, and the user blockchain determining capital distribution based on contract capital allocation determined by the set of rules set by the user. The valid amplification event payouts are claimed by registering a payout transaction in the transaction ledger indicating capital distributed to the user in exchange for earned amplification credits/tokens registered in the transaction ledger.

The remote computer-based service system retains the set of rules, the set of rules set by the user are duplicated to the user blockchain, the set of rules being registered by the 3rd party service/content providers via a registration request to the remote computer-based service system. The registration request registers the campaign identifications, amplified content, and the set of rules, and the remote computer-based service system registers valid amplification event payouts by using the user identification for blockchain mapping. The remote computer-based service system calculates the valid amplification event payouts based on user demographic data retrieved from the user blockchain.

A blockchain-enabled crypto asset compliance system operable within a computer network environment tracks asset allocation. The remote computer-based service system provides and maintains a cross provider reference database for mapping media provider content to media content hashes within a media content pool preferably via either a metadata mapping mechanism or a media content finger printing mechanism. Client devices are used by users for creating media content playlists as a basis for media content order hash generation. The client devices pull media content hashes from the media content pool, and use the media content playlists and the media content hashes stored in the cross-provider reference database as inputs for algorithm generation. The clients generate an ordered media content list hash that is submitted to the user blockchain.

The user blockchain provides both a mechanism for storing and releasing user data, and a mechanism to release the user's personal data for economic consideration, and operates to hold a transaction ledger for tracking blockchain transactions based on media content consumption and is being usable by the user to redeem rewards offered by $3^{rd}$ party service/content providers.

The ordered media content list hash matches a hidden list hash for prompting both new token generation, and supplemental ordered song list hash generation. The user blockchain is initiated when contract initiation rules are met, original asset allocations being assigned on contract initiation by requests from a primary initiating partner and a secondary initiating partner via identical contract initiation allocations. The user blockchain preferably generates new tokens via an algorithmic mint process comprising the step of generating the hidden list hash from a list of the media content hashes.

The algorithmic mint process may preferably operate based on an ever-increasing number of media content files associated with every hash matched against a client hash submitted by the client devices. Hidden hash complexity is driven by first and second factors, the first factor being the number of media content files in the hidden ordered media content list hash, and the second factor being the number of possible media content files available to fit into each position in the hidden ordered media content list hash, each position being randomly filled from the media content hash pool. When media content hashes are added to the media content pool by the secondary initiating partner, the media content hashes are added to the cross-provider reference database, which cross provider reference database maps 3rd party service/content provider data to the media content hashes.

Accordingly, although the invention has been described by reference to certain preferred systemic embodiments and certain associated methodologies, it is not intended that the novel systemic embodiments and associated methods be limited thereby, but that modifications thereof are intended to be included as falling within the broad scope and spirit of the foregoing disclosures and the appended drawings.

What is claimed is:

1. A Digital Social Recorder system operable within a computer network environment configured to allow (a) a series of users to comment and engage with a broadcast to be registered in a centralized manner, and (b) the series of users to see social commentary related to specific portions of the broadcast, the Digital Social Recorder system comprising:
   a remote computer-based service system within the computer network environment, the remote computer-based service system being configured to provide and maintain a cross provider reference database, the cross provider reference database being configured to map media provider content to media content hashes within a media content pool via one of a metadata mapping mechanism or a media content finger printing mechanism;
   a video indexing and video search system, in co-operation with the remote computer-based system, configured to search video content and index event broadcast streams via the remote computer-based system;
   the event broadcast streams being from different legally compliant content sources and indexed into pixel indexes, each pixel index comprising a pixel matrix in which a select video frame dimension, as selected from a video frame height and a video frame width, is held constant, and the select video frame dimension varies based on original video aspect ratio;
   a series of client devices configured to enable the series of users to interact with the remote computer-based system; and
   a non-transitory computer-implementable application implementable via the series of client devices and the remote computer-based service system is configured to enable the series of users (a) to initiate social commentary atop select video content via the series of client devices; (b) input personal demographic data and data release rules to the remote computer-based service system; and (c) set data retention rules;
   the Digital Social Recorder system being configured to allow the series of users to view therethrough the broadcast through a legally compliant content source selected by each user, with social commentary generated by users being communicated to other users simultaneously;
   each user being able to view previous portions of the broadcast with social content layered atop the previous portions of the broadcast when the broadcast is live, and each user being able to view social commentary layered atop the broadcast as the user watches the broadcast when the broadcast is pre-recorded and viewed through an on-demand service;
   the video indexing and video search system being further configured to map video content back to an original broadcast, the video content being from the same or different legally compliant content sources.

2. The Digital Social Recorder system of claim 1 wherein the video indexing and video search system is configured to commence in response to a select video file or a select video file URL being submitted by a select client device to the remote computer-based system, and to process the select video file or video file URL into a series of frames, the series of frames being extracted into a target image size.

3. The Digital Social Recorder system of claim 2 wherein the video indexing and video search system is configured to produce a concatenated pixel search matrix from the series of frames to query against a video database.

4. The Digital Social Recorder system of claim 2 wherein the video indexing and video search system is configured to produce a series of pixel search matrices, a concatenated pixel search matrix being produced for each frame of the series of frames used in a search query.

5. The Digital Social Recorder system of claim 1 wherein the video indexing and video search system is configured to allow broadcasters to locate streams/content, the streams/content being queried by a web crawling system, the web crawling system being configured to output video content posted on social networks, and map the video content posted on social networks to their original streams.

6. The Digital Social Recorder system of claim 5 wherein the video content posted on social networks and mapped to their original streams may be indexed and referenced in a social reference database, the social reference database being configured to associate social posts with stream identifiers and start and stop positions for social commentary.

7. The Digital Social Recorder system of claim 6 wherein the series of client devices are enabled to stream content;

retrieve social post data from the social reference database; layer or overlay social commentary on a video timeline; or display social commentary as video content is streamed.

8. The Digital Social Recorder system of claim 1 wherein performer attribution is added to reference data within the remote computer-based service system in order to facilitate payout to select performers via a smart contract.

9. The Digital Social Recorder system of claim 1 configured to enable contextual advertisement placement or a contextual advertisement metadata overlay based upon video content consumption and/or social commentary associated with video content consumption relevant to saved user profile information saved within a crypto ghost coin account, the crypto ghost coin account being configured to shield an identity of a user being rewarded for activity participation while simultaneously being targeted based on personal demographic, geographic, and consumption behavior.

10. A Digital Social Recorder system operable within a computer network environment configured to allow (a) a series of users to comment and engage with a broadcast to be registered in a centralized manner, and (b) the series of users to see social commentary related to specific portions of the broadcast, the Digital Social Recorder system comprising:
 a remote computer-based service system within the computer network environment, the remote computer-based service system being configured to provide and maintain a cross provider reference database, the cross provider reference database being configured to map media provider content to media content hashes within a media content pool via one of a metadata mapping mechanism or a media content finger printing mechanism;
 a video search system, in co-operation with the remote computer-based system, configured to search video content via the remote computer-based system and map video content back to an original broadcast, the video content being from the same or different networks, the video search system utilizing a deduplication process, the deduplication process being configured to create references in a pixel reference database for portions of select same streams with references to a deduplicated pixel index which create a many to one relationship between the select same streams and the pixel indexes;
 a series of client devices configured to enable the series of users to interact with the remote computer-based system; and
 a non-transitory computer-implementable application implementable via the series of client devices and the remote computer-based service system configured to enable the series of users (a) to initiate social commentary atop select video content via the series of client devices; (b) input personal demographic data and data release rules to the remote computer-based service system; and (c) set data retention rules;
 the Digital Social Recorder system being configured to allow the series of users to view therethrough the broadcast through a legally compliant content source selected by each user, with social commentary generated by users being communicated to other users simultaneously;
 each user being able to view previous portions of the broadcast with social content layered atop the previous portions of the broadcast when the broadcast is live, and each user being able to view social commentary layered atop the broadcast as the user watches the broadcast when the broadcast is pre-recorded and viewed through an on-demand service.

11. The Digital Social Recorder system of claim 10 wherein the video search system is configured to commence in response to a select video file or a select video file URL being submitted by a select client device to the remote computer-based system, and to process the select video file or video file URL into a series of frames, the series of frames being extracted into a target image size.

12. The Digital Social Recorder system of claim 11 wherein the video search system is configured to produce a concatenated pixel search matrix from the series of frames to query against a video database.

13. The Digital Social Recorder system of claim 11 wherein the video search system is configured to produce a series of pixel search matrices, a concatenated pixel search matrix being produced for each frame of the series of frames that will be used in a search query.

14. The Digital Social Recorder system of claim 10 wherein the video search system is configured to allow broadcasters to locate streams/content, the streams/content being queried by a web crawling system, the web crawling system being configured to output video content posted on social networks, and map the video content posted on social networks to their original streams.

15. The Digital Social Recorder system of claim 14 wherein the video content posted on social networks and mapped to their original streams may be indexed and referenced in a social reference database, the social reference database being configured to associate social posts with stream identifiers and start and stop positions for social commentary.

16. The Digital Social Recorder system of claim 15 wherein the series of client devices are enabled to stream content; retrieve social post data from the social reference database; overlay social commentary on a video timeline; or display social commentary as video content is streamed.

17. The Digital Social Recorder system of claim 10 wherein performer attribution is added to reference data within the remote computer-based service system in order to facilitate payout to select performers via a smart contract.

18. The Digital Social Recorder system of claim 10 configured to enable contextual advertisement placement or a contextual advertisement metadata overlay based upon video content consumption and/or social commentary associated with video content consumption relevant to saved user profile information saved within a crypto ghost coin account, the crypto ghost coin account being configured to shield an identity of a user being rewarded for activity participation while simultaneously being targeted based on personal demographic, geographic, and consumption behavior.

19. The Digital Social Recorder system of claim 10 wherein event broadcast streams may be indexed by pixel indexes, the video search system comprising a mechanism to size video frames into a standardized aspect ratio for simplifying a search process.

20. A Digital Social Recorder system operable within a computer network environment which is configured to allow (a) a series of users to comment and engage with a broadcast to be registered in a centralized manner, and (b) the series of users to see social commentary from at least one social network related to specific portions of the broadcast, the Digital Social Recorder system being agnostic to the at least one social network and comprising:
 a remote computer-based service system within the computer network environment, the remote computer-based service system being configured to provide and maintain a cross provider reference database, the cross provider reference database being configured to map media provider content to media content hashes within a media content pool via one of a metadata mapping mechanism or a media content finger printing mechanism;

a video search system, in co-operation with the remote computer-based system, configured to search video content via the remote computer-based system and map video content back to an original broadcast by indexing event broadcast streams, the event broadcast streams being from different networks and indexed into pixel indexes, the video search system comprising a mechanism to size all frames into a standardized aspect ratio for simplifying a search process;

a series of client devices configured to enable the series of users to interact with the remote computer-based system; and a non-transitory computer-implementable application implementable via the series of client devices and the remote computer-based service system is configured to enable the series of users (a) to initiate social commentary atop select video content via the series of client devices; (b) input personal demographic data and data release rules to the remote computer-based service system; and (c) set data retention rules;

the Digital Social Recorder system being configured to allow the series of users to view therethrough the broadcast through a legally compliant content source selected by each user, with social commentary generated by users being communicated to other users simultaneously;

each user being able to view previous portions of the broadcast with social content from at least one social network layered atop the previous portions of the broadcast when the broadcast is live, and each user being able to view social commentary from at least one social network layered atop the broadcast as the user watches the broadcast when the broadcast is pre-recorded and viewed through an on-demand service.

21. The Digital Social Recorder system of claim 20 wherein the video search system utilizes a deduplication process, the deduplication process being configured to create references in a pixel reference database for portions of select same streams with references to a deduplicated pixel index which create a many to one relationship between the select same streams and the pixel indexes.

22. The Digital Social Recorder system of claim 20 wherein the video search system is configured to commence in response to a select video file or a select video file URL being submitted by a select client device to the remote computer-based system, and to process the select video file or video file URL into a series of frames, the series of frames being extracted into a target image size.

23. The Digital Social Recorder system of claim 22 wherein the video search system is configured to produce a concatenated pixel search matrix from the series of frames to query against a video database.

24. The Digital Social Recorder system of claim 22 wherein the video search system is configured to produce a series of pixel search matrices, a concatenated pixel search matrix being produced for each frame of the series of frames used in a search query.

25. The Digital Social Recorder system of claim 20 wherein the video search system is configured to allow broadcasters to locate streams/content, the streams/content being queried by a web crawling system, the web crawling system being configured to output video content posted on social networks, and map the video content posted on social networks to their original streams.

26. The Digital Social Recorder system of claim 25 wherein the video content posted on social networks and mapped to their original streams may be indexed and referenced in a social reference database, the social reference database being configured to associate social posts with stream identifiers and start and stop positions for social commentary.

27. The Digital Social Recorder system of claim 26 wherein the series of client devices are enabled to stream content; retrieve social post data from the social reference database; overlay social commentary on a video timeline; or display social commentary as video content is streamed.

28. The Digital Social Recorder system of claim 20 wherein performer attribution is added to reference data within the remote computer-based service system in order to facilitate payout to select performers via a smart contract.

29. The Digital Social Recorder system of claim 20 configured to enable contextual advertisement placement or a contextual advertisement metadata overlay targeted to a user, based upon the user's personal demographic information, geographic location, or consumption of video content and/or social commentary associated with video content, where the user's identity is protected by a crypto ghost coin or token account.

30. A Digital Social Recorder system operable within a computer network environment configured to allow (a) a series of users to comment and engage with a broadcast to be registered in a centralized manner, and (b) the series of users to see social commentary related to specific portions of the broadcast, the Digital Social Recorder system comprising:

a remote computer-based service system within the computer network environment, the remote computer-based service system being configured to provide and maintain a cross provider reference database, the cross-provider reference database being configured to map media provider content to media content hashes within a media content pool via one of a metadata mapping mechanism or a media content finger printing mechanism;

a video search system, in co-operation with the remote computer-based system, configured to search video content via the remote computer-based system and map video content back to an original broadcast by indexing event broadcast streams, the event broadcast streams being indexed into pixel indexes, the video content being from the same or different networks, the video search system comprising a mechanism to size video frames into a standardized aspect ratio for simplifying a search process;

a series of client devices configured to enable the series of users to interact with the remote computer-based system; and a non-transitory computer-implementable application implementable via the series of client devices and the remote computer-based service system configured to enable the series of users (a) to initiate social commentary atop select video content via the series of client devices; (b) input personal demographic data and data release rules to the remote computer-based service system; and (c) set data retention rules;

the Digital Social Recorder system being configured to allow the series of users to view therethrough the broadcast through a legally compliant content source selected by each user, with social commentary generated by users being communicated to other users simultaneously;

each user being able to view previous portions of the broadcast with social content layered atop the previous portions of the broadcast when the broadcast is live, and each user being able to view social commentary layered atop the broadcast as the user watches the broadcast when the broadcast is pre-recorded and viewed through an on-demand service.

\* \* \* \* \*